US011962076B2

(12) United States Patent
Imamura

(10) Patent No.: US 11,962,076 B2
(45) Date of Patent: Apr. 16, 2024

(54) ANTENNA DEVICE

(71) Applicant: HARADA INDUSTRY CO., LTD., Tokyo (JP)

(72) Inventor: Yutaka Imamura, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 244 days.

(21) Appl. No.: 17/274,391

(22) PCT Filed: Sep. 13, 2019

(86) PCT No.: PCT/JP2019/036233
§ 371 (c)(1),
(2) Date: Mar. 8, 2021

(87) PCT Pub. No.: WO2020/054870
PCT Pub. Date: Mar. 19, 2020

(65) Prior Publication Data
US 2022/0052447 A1 Feb. 17, 2022

(30) Foreign Application Priority Data

Sep. 14, 2018 (JP) .................................. 2018-172263
Mar. 29, 2019 (JP) .................................. 2019-068869

(51) Int. Cl.
*H01Q 1/32* (2006.01)
*H01Q 1/52* (2006.01)
(52) U.S. Cl.
CPC ............. *H01Q 1/3275* (2013.01); *H01Q 1/52* (2013.01)

(58) Field of Classification Search
CPC ............................... H01Q 1/3275; H01Q 1/52
See application file for complete search history.

(56) References Cited

U.S. PATENT DOCUMENTS

| 5,568,157 A | * | 10/1996 | Anderson ................ H01Q 5/40 343/729 |
| 6,018,322 A | | 1/2000 | Taniguchi et al. |
| 6,809,686 B2 | * | 10/2004 | Du ........................ H01Q 9/0464 343/846 |
| 9,270,017 B2 | * | 2/2016 | Villarroel ............. H01Q 1/3275 |
| 2008/0129635 A1 | | 6/2008 | Surittikul et al. |
| 2010/0013724 A1 | | 1/2010 | Ohshima et al. |

(Continued)

FOREIGN PATENT DOCUMENTS

| JP | S63133073 A | 6/1988 |
| JP | H02-126413 A | 10/1990 |

(Continued)

OTHER PUBLICATIONS

The International Preliminary Report on Patentability dated Mar. 25, 2021.

*Primary Examiner* — Hasan Islam
(74) *Attorney, Agent, or Firm* — Global IP Counselors, LLP

(57) ABSTRACT

An antenna device for a vehicle includes an antenna element having a first main surface, a shielding plate having a second main surface facing the first main surface and wider than the first main surface, the shielding plate being located between the antenna element and a noise source in the vehicle, and an insulating member located between the first main surface and the second main surface to integrate the antenna element and the shielding plate.

13 Claims, 13 Drawing Sheets

(56) References Cited

U.S. PATENT DOCUMENTS

| | | | |
|---|---|---|---|
| 2010/0117912 A1* | 5/2010 | Noro | H01Q 9/0407 343/878 |
| 2010/0265147 A1* | 10/2010 | Wakui | H01Q 1/36 343/725 |
| 2010/0328179 A1* | 12/2010 | Takisawa | H01Q 1/1207 343/841 |
| 2015/0357705 A1 | 12/2015 | Ito | |
| 2016/0285175 A1* | 9/2016 | Juan | H01Q 1/1214 |
| 2017/0104275 A1 | 4/2017 | Yanagisawa et al. | |
| 2017/0317408 A1 | 11/2017 | Hamada et al. | |
| 2018/0037007 A1 | 2/2018 | Droste et al. | |
| 2018/0212301 A1 | 7/2018 | Iino | |
| 2019/0237866 A1 | 8/2019 | Kiyokawa | |
| 2020/0292654 A1 | 9/2020 | Kumagai | |

FOREIGN PATENT DOCUMENTS

| | | |
|---|---|---|
| JP | H9-307334 A | 11/1997 |
| JP | 2003-017916 A | 1/2003 |
| JP | 2007153019 A | 6/2007 |
| JP | 2008141766 A | 6/2008 |
| JP | 2009135741 A | 6/2009 |
| JP | 2010-021856 A | 1/2010 |
| JP | 2015-133692 A | 7/2015 |
| JP | 2015179896 A | 10/2015 |
| JP | 2016-012915 A | 1/2016 |
| JP | 2017-200086 A | 11/2017 |
| JP | 2018074371 A | 5/2018 |
| JP | 2018514149 A | 5/2018 |
| JP | 2018-121143 A | 8/2018 |
| WO | 2016162252 A1 | 10/2016 |
| WO | 2017/170906 A1 | 10/2017 |

* cited by examiner

ANTENNA DEVICE

CROSS-REFERENCE TO RELATED APPLICATIONS

This application is a U.S. national stage application of International Application No. PCT/JP2019/036233, filed on Mar. 6, 2019, which claims priority to Japanese Patent Application No. 2018-172263, filed on Sep. 14, 2018, and Japanese Patent Application No. 2019-068869, filed on Mar. 29, 2019.

TECHNICAL FIELD

The present invention relates to an antenna device for a vehicle, and more particularly, to an antenna device installed in a vehicle or an exterior component of the vehicle.

BACKGROUND INFORMATION

A vehicle such as a passenger car is equipped with an antenna device that transmits and receives radio waves used for radio broadcasting, GPS (global positioning system), an ETC system (electronic toll collection), or the like. For example, Japanese Unexamined Patent Application Publication No. 2009-135741 (Patent Literature 1) discloses an antenna device mounted on a roof of a vehicle. When the antenna device is mounted on a metal roof as in Patent Literature 1, noise generated from an electronic device disposed in the vehicle and directed toward the antenna device is shielded by the roof.

An antenna device as shown in Patent Literature 1 is one of exterior components of a vehicle. Therefore, when the antenna device disclosed in Patent Literature 1 is used, the appearance of the vehicle may be impaired. As a countermeasure against such a problem, for example, an antenna device may be accommodated in a vehicle. Patent Literature 2 discloses an onboard antenna accommodated in a door panel of an automobile made of synthetic resin. The onboard antenna disclosed in Japanese Unexamined Patent Application Publication No. 2007-153019 (Patent Literature 2) is disposed on the opposite side of an engine room via a metal reinforcing plate used for reinforcing the strength of the door panel to prevent noise generated in the engine room from entering the onboard antenna.

SUMMARY

In Patent Literature 2, the shape and arrangement of the onboard antenna inevitably depend on the position of the engine room in the vehicle and the shape of the reinforcing plate. In addition, in recent years, since a large number of electronic devices and electrical components are mounted on vehicles such as automobiles, there are cases where it is insufficient to shield noise generated from the engine room. Therefore, the degree of freedom in the arrangement and design of the onboard antenna as disclosed in Patent Literature 2 is extremely narrow.

In view of the above-described problems, an object of the present invention is to provide an antenna device capable of increasing the degree of freedom in arrangement and design.

An antenna device for a vehicle according to an aspect of the present invention includes an antenna element having a first main surface, a shielding plate having a second main surface facing the first main surface and wider than the first main surface, the shielding plate being located between the antenna element and a noise source in the vehicle, and an insulating member located between the first main surface and the second main surface to integrate the antenna element and the shielding plate.

The antenna device includes a shielding plate located between the antenna element and the noise source in the vehicle. Accordingly, even when a metal member or the like of the vehicle is not disposed between the antenna element and the noise source in the vehicle, the noise generated by the noise source is prevented from entering the antenna element by the shielding plate. Therefore, since the shape and the arrangement of the antenna device are less likely to be limited by the shape of the metal member or the like, the degree of freedom of the arrangement and the design of the antenna device can be increased. In addition, the antenna element and the shielding plate are integrated via an insulating member located between the first main surface and the second main surface. As a result, since the distance between the antenna element and the shielding plate is favorably maintained by the insulating member, the shielding plate can be set to the conductive member closest to the antenna element. Therefore, since the influence of the shielding plate on the antenna performance becomes dominant, the antenna performance can be easily stabilized. Furthermore, since the antenna element and the shielding plate are firmly fixed by the insulating member, adverse effects such as noise caused by sub-resonance resulting from vibration of the vehicle can be reduced.

The antenna device may further include a circuit substrate provided on the second main surface of the shielding plate and electrically connected to the antenna element, and the circuit substrate may be smaller than the first main surface in a plan view. In this case, the influence of the circuit substrate on the antenna performance is reduced. In addition, the circuit substrate may include a substrate portion attached to the second main surface and an amplifier circuit provided on the substrate portion, and the amplifier circuit may be located between the antenna element and the substrate portion. In this case, it is possible to improve the degree of freedom in designing the circuit substrate and to reduce the thickness of the antenna device.

The antenna device may further include a circuit substrate provided apart from the shielding plate and electrically connected to the antenna element, and the circuit substrate may be accommodated in a cover and mounted on the antenna element, or accommodated in the vehicle. In this case, since the circuit substrate can be disposed at a position not overlapping the antenna element in a plan view, the distance between the shielding plate and the antenna element can be easily narrowed. As a result, the performance degradation of the antenna device caused by the circuit substrate can be suppressed, and the reception sensitivity of the antenna device can be favorably stabilized. In addition, since the antenna device can be stored in a narrower space and the circuit substrate can be easily protected from moisture or the like, the flexibility of arrangement of the antenna device can be further improved.

The antenna device may further include an inductor electrically connected to the circuit substrate and the antenna element. In this case, the antenna device can be downsized while maintaining the electrical length of the antenna device.

The shielding plate may be directly mounted on a metal member of the vehicle. In this case, when the antenna device is fixed to the vehicle, the shielding plate is reliably grounded by the metal member of the vehicle. Therefore, even when the antenna element is located in the vicinity of the metal member of the vehicle, the antenna element is less likely to be affected by the metal member, and thus it is possible to suppress a change in the resonance frequency of the antenna device before and after the antenna device is mounted on the vehicle.

The antenna device may further include aground wire electrically connected to the shielding plate, and a length of the ground wire may be 10 cm or less. In this case, the fluctuation of the resonance frequency of the antenna device due to the ground wire is suppressed.

The antenna device may further include aground wire electrically connected to the shielding plate, and the ground wire may have a length of the ground wire may be 70 cm or more and 100 cm or less. In this case, the ground wire can function as a short stub in the FM waveband. Therefore, when the antenna device receives the radio wave of the FM waveband, the fluctuation of the resonance frequency of the antenna device caused by the ground wire is suppressed, and the influence of the noise shielding performance of the shielding plate by the ground wire is particularly suppressed. In addition, the position where the antenna device is disposed is less likely to be limited by the position where the ground wire is attached to the vehicle. Therefore, the degree of freedom of the arrangement of the antenna device can be further increased.

At least one of the antenna element and the shielding plate may has flexibility. In this case, the antenna device can be easily accommodated in a vehicle or the like.

The antenna device may be installed in an exterior component of the vehicle. A metal member capable of shielding noise may not be disposed between the exterior component of the vehicle and the noise source in the vehicle. Even in such a case, the noise can be suitably shielded from entering the antenna element by the shielding plate. Therefore, even when the antenna device is installed in the exterior component of the vehicle, the antenna performance of the antenna device can be suitably exhibited.

In one embodiment, the antenna element may include a first antenna element to receive an AM signal and a second antenna element to receive an FM signal, and the first antenna element and the shielding plate may be disposed so as to overlap each other, and the second antenna element and the shielding plate may be disposed so as not to overlap each other in a plan view. The first antenna element is less likely to be affected by surrounding conductors, whereas the reception sensitivity of the second antenna element may decrease when there is a conductor around the second antenna element. In this embodiment, since the first antenna element and the shielding plate, which is a conductor, are disposed so as to overlap each other, it is possible to suppress noise toward the first antenna element by the shielding plate while ensuring the reception sensitivity of the AM signal. On the other hand, since the second antenna element and the shielding plate, which is a conductor, are disposed so as not to overlap each other, it is possible to suppress a degradation in the reception sensitivity of the FM signal.

According to the present invention, it is possible to provide an antenna device capable of increasing the degree of freedom in arrangement and design.

BRIEF DESCRIPTION OF DRAWINGS

Referring now to the attached drawings which form apart of this original disclosure.

FIG. 3 is exposed.

DETAILED DESCRIPTION OF EMBODIMENTS

Figure 1:
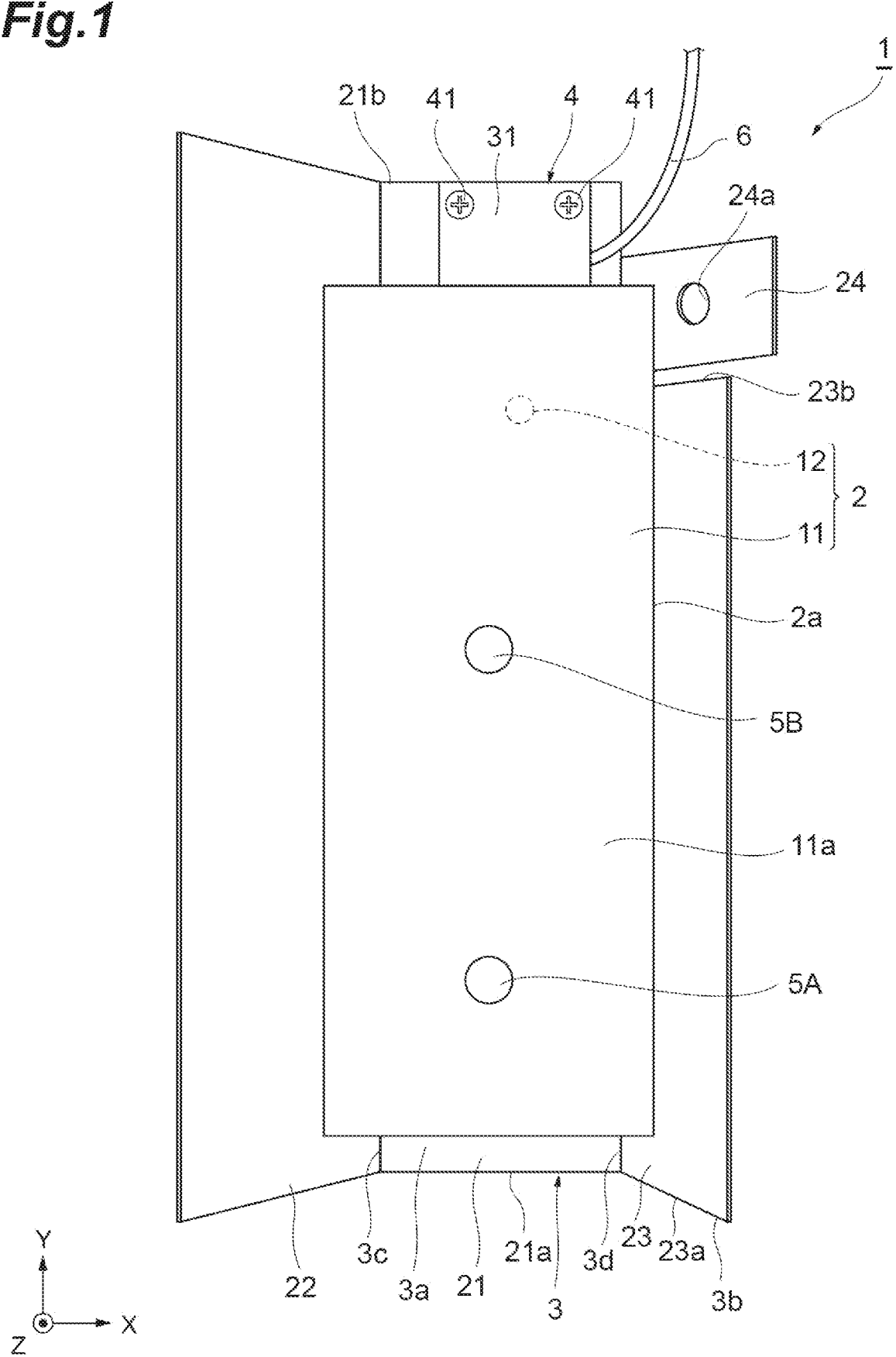
FIG. 1 is a schematic plan view of an antenna device according to the first embodiment.

Hereinafter, preferred embodiments of the present invention will be described in detail with reference to the accompanying drawings. In the following description, the same element or an element having the same function is denoted by the same reference numeral, and redundant description is omitted.

First Embodiment

Figure 3:
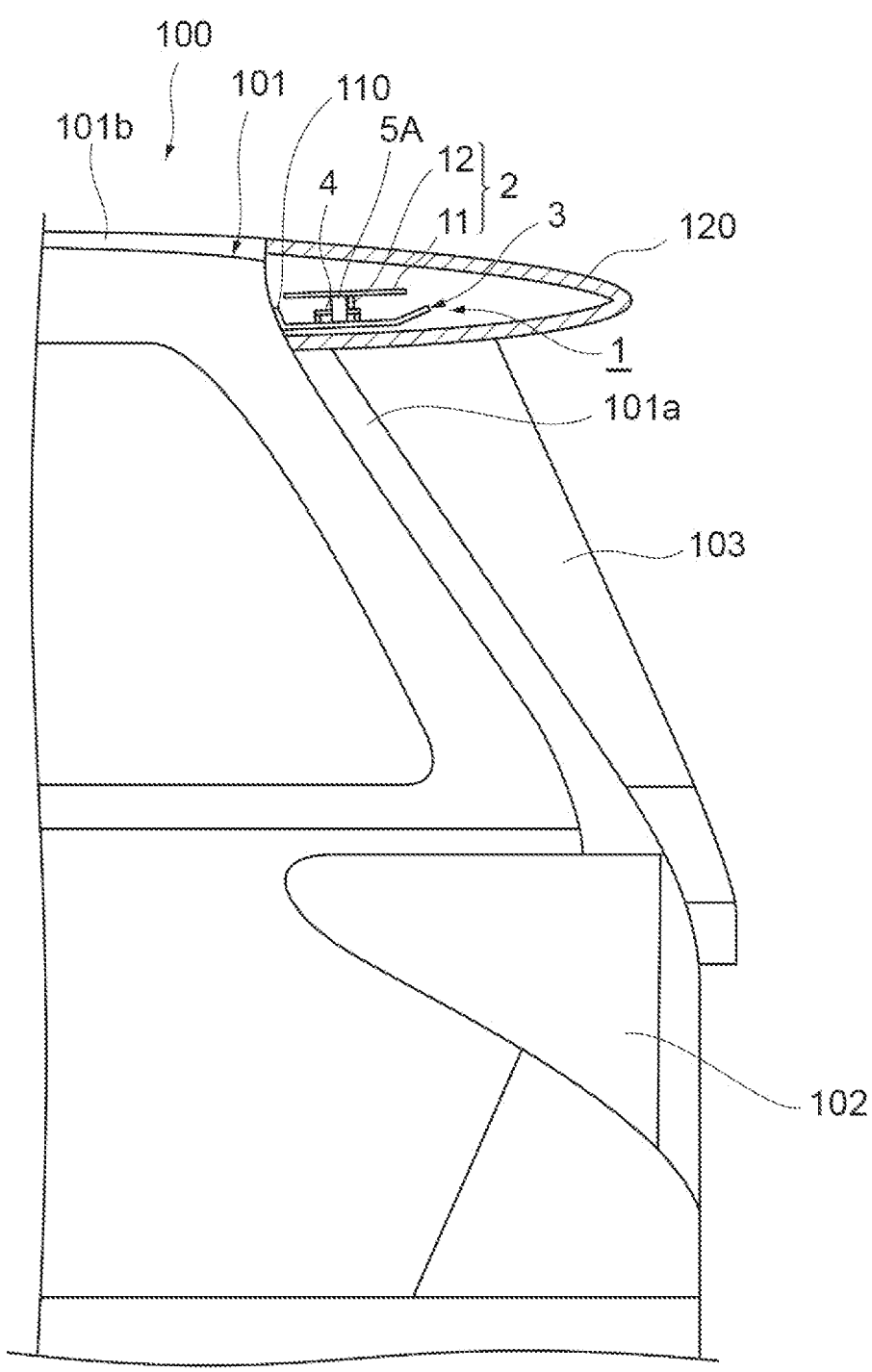
FIG. 3 is a diagram showing a mounted state of the antenna device according to the first embodiment.

The antenna device according to a first embodiment is, for example, a monopole antenna or a dipole antenna for a vehicle. The antenna device 1 has a function of transmitting and receiving radio waves used for, for example, AM radio, FM radio, DAB (Digital Audio Broadcast), terrestrial digital broadcasting, BAND 3, telephone, and the like. One of the resonance frequencies of the antenna device according to the first embodiment is set to 92 MHz. The antenna device is installed in the vehicle or an exterior component of the vehicle, and is connected to an electronic device mounted in the vehicle via a cable. The inside of the vehicle is, for example, a gap between the body shell and the indoor space. The gap is, for example, a space provided between the roof and the ceiling. The exterior component is, for example, a spoiler, a bumper, or the like. As shown in FIG. 3 described later, the antenna device 1 according to the first embodiment is attached to, for example, a rear portion of a vehicle 100 and installed in a rear spoiler 120 that is an exterior component. A specific example of the mounting state of the antenna device according to the first embodiment will be described later.

Figure 2A:
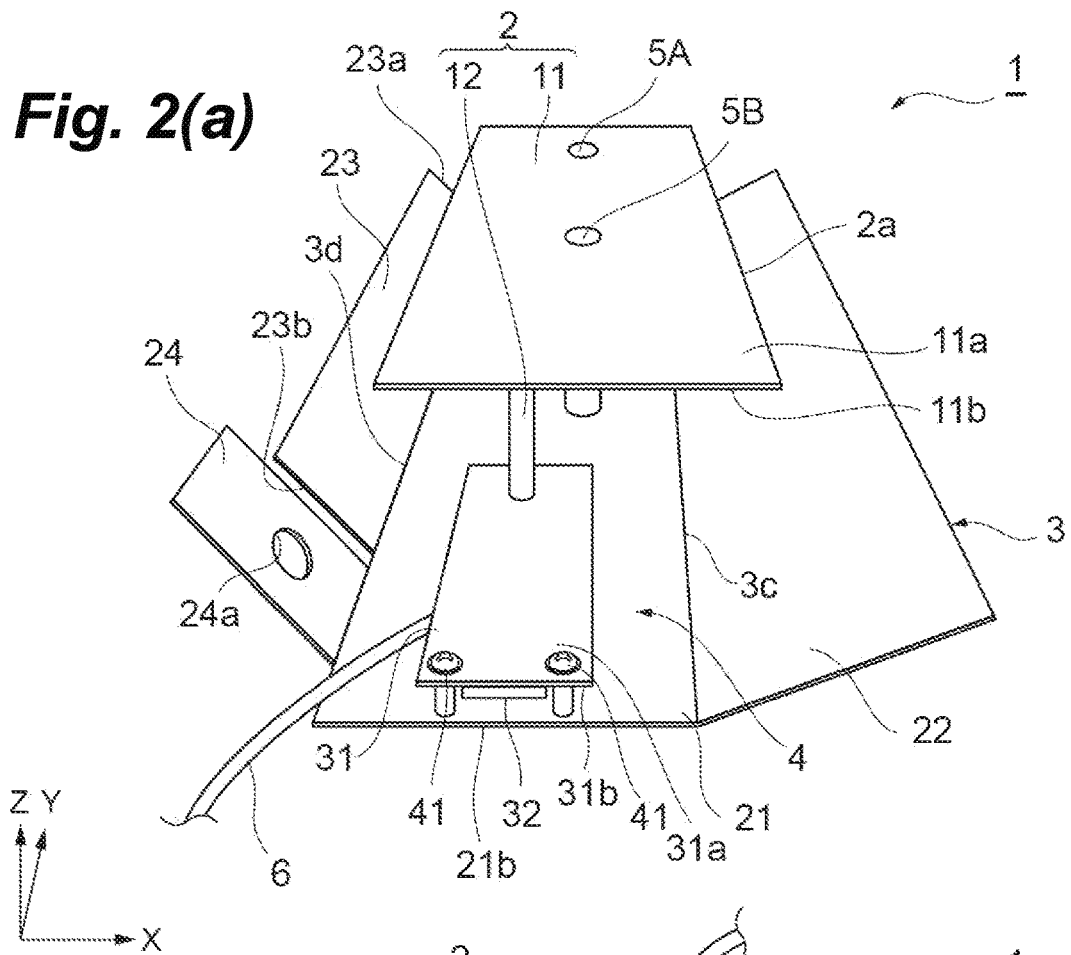
FIGS. 2(a) and 2(b) are perspective views schematically showing the antenna device according to the first embodiment.
Figure 2B:
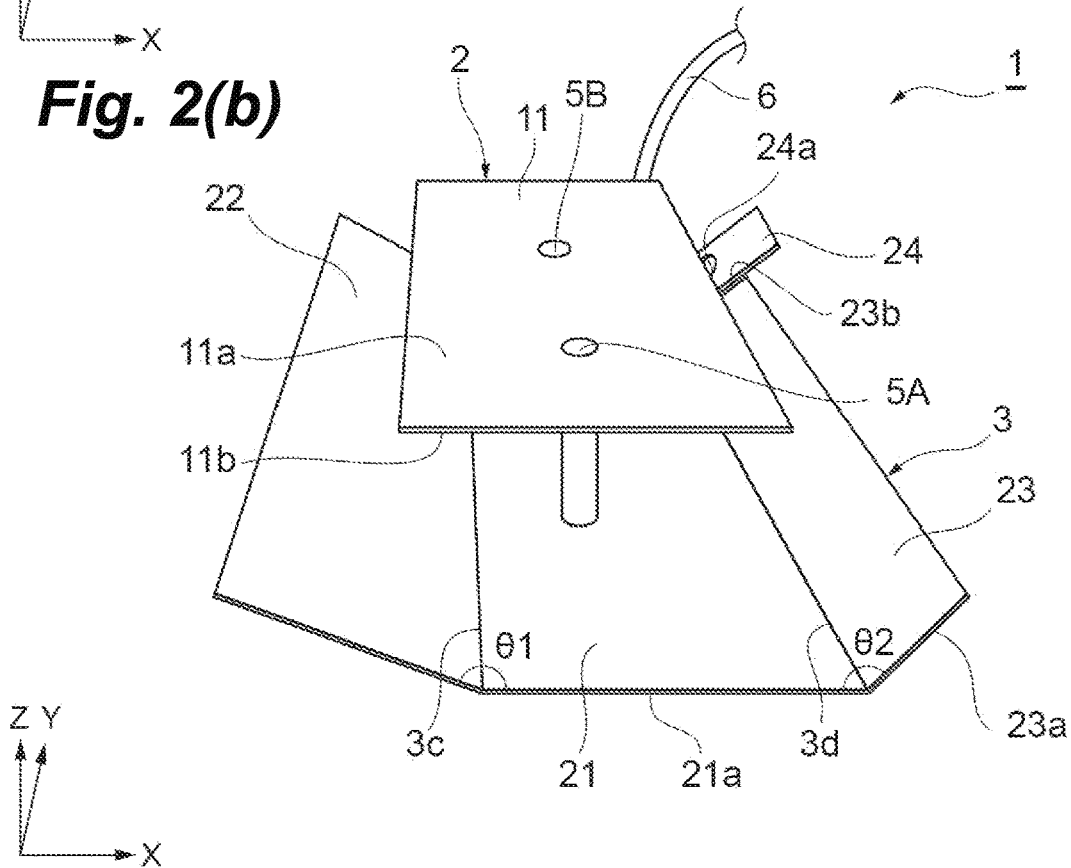

The configuration of the antenna device according to the first embodiment will be described with reference to FIG. 1, FIG. 2(a) and FIG. 2(b). FIG. 1 is a schematic plan view of the antenna device according to the first embodiment. FIGS.

2(a) and 2(b) are perspective views schematically showing the antenna device according to the first embodiment. FIG. 2(a) shows the antenna device viewed from a predetermined direction, and FIG. 2(b) shows the antenna device viewed from a direction opposite to the predetermined direction. The antenna device 1 shown in FIG. 1 and FIGS. 2(a) and 2(b) includes an antenna element 2, a shielding plate 3, a circuit substrate 4, insulating members 5A and 5B, and a cable 6 electrically connected to the antenna element 2. The antenna device 1 is configured by sequentially stacking the antenna element 2, the circuit substrate 4 and the shielding plate 3. Therefore, the shielding plate 3 is provided on the side opposite to the antenna element 2 via the circuit substrate 4. The cable 6 is, for example, a coaxial cable, and electrically connects the antenna element 2 and an electronic device in the vehicle.

The antenna element 2 is a conductive member that receives radio waves. In the first embodiment, the antenna element 2 has an substantially rectangular shape in a plan view (a view in Z direction). Hereinafter, a direction along the short side of the antenna element 2 in a plan view is referred to as an X direction, a direction along the long side of the antenna element 2 is referred to as a Y direction, and a direction orthogonal to the X direction and the Y direction is referred to as a Z direction. The Z direction corresponds to a stacking direction in which the antenna element 2, the shielding plate 3, and the circuit substrate 4 are stacked each other. The dimension of the antenna element 2 in the X direction is, for example, 5 mm or more and 200 mm or less. The dimension of the antenna element 2 in the Y direction is, for example, 50 mm or more and 1000 mm or less. The antenna element 2 may have flexibility.

The antenna element 2 includes an element portion 11 having a pair of main surfaces 11a and 11b intersecting the Z direction, and a power supply portion 12 extending from the main surface 11b (first main surface) of the element portion 11 toward the circuit substrate 4. The element portion 11 is a plate-shaped conductive member formed of, for example, a metal plate or an alloy plate, and has an substantially rectangular shape in a plan view. One end of the power supply portion 12 and one end of the insulating members 5A and 5B are fixed to the element portion 11. The power supply portion 12 is a portion that electrically connects the antenna element 2 and the wiring on the circuit substrate 4, and is formed of a conductive member different from the element portion 11. By providing the power supply portion 12, radio frequency power received by the element portion 11 can be transmitted to the circuit substrate 4, and radio frequency power input to the circuit substrate 4 via the cable 6 can be transmitted to the element portion 11. The power supply portion 12 is integrated with the element portion 11 by welding or the like, for example. The power supply portion 12 has, for example, a rod shape extending in the Z direction, and is positioned between the element portion 11 and the circuit substrate 4 in the Z direction. A length of the power supply portion 12 along the Z direction is, for example, 10 mm or more and 50 mm or less. The length of the power supply portion 12 may correspond to the distance between the antenna element 2 and the shielding plate 3 in the Z direction. The distance between the antenna element 2 and the shielding plate 3 in the Z direction is not limited to 10 mm or more and 50 mm or less.

The shielding plate 3 is a conductive member that prevents noise from entering the antenna element 2, and is formed of, for example, a metal plate or an alloy plate. The shielding plate 3 may have flexibility. The performance of the monopole antenna such as the antenna device 1 tends to vary depending on the positional relationship between an antenna element and a conductive member in the vicinity of the antenna element. In the antenna device 1 of the first embodiment, the shielding plate 3 functions as a conductive member near the antenna element 2. Therefore, when the antenna device 1 is mounted on a vehicle, the influence of the shielding plate 3 on the performance of the antenna device 1 is more dominant than that of other metal members of the vehicle. Therefore, when the antenna device 1 is mounted on a vehicle, the performance of the antenna device 1 is less likely to be affected by the metal member of the vehicle. The metal member of the vehicle is, for example, the entire body shell or a part thereof (a body, a frame, a roof, an outer panel of a door, or the like).

The shielding plate 3 of the first embodiment is, in particular, a member for suppressing noise generated by a noise source in the vehicle from entering the antenna element 2. Therefore, when the antenna device 1 is installed in a vehicle or an exterior component of the vehicle, the shielding plate 3 is located between the antenna element 2 and the noise source. At this time, the shielding plate 3 is grounded by being electrically connected to, for example, a metal member of the vehicle. The shielding plate 3 may be in direct contact with a metal member of the vehicle, or may be electrically connected to the metal member via a bracket, a ground wire, or the like. Examples of the noise source in the vehicle include electrical components such as various lamps, various wipers, a back camera, a compressor, an inverter, and a motor, and electronic devices such as a monitor mounted in the vehicle. The noise source may be limited according to the position where the antenna device 1 is installed. That is, not all the electrical components and electronic devices in the vehicle may be interpreted as the noise sources, and only the electrical components and electronic devices that generate noise that adversely affects the antenna device 1 may be interpreted as the noise sources. For example, in a case where the antenna device 1 is installed in a rear spoiler, the electrical component serving as the noise source may be a rear wiper, a back camera, a tail lamp, an inverter, or the like.

From the viewpoint of satisfactorily exhibiting a suppressing effect of the entry of noise into the antenna element 2 and from the viewpoint of stabilizing the reception sensitivity of the antenna device 1, the main surface 3a (second main surface) of the shielding plate 3 facing the main surface 11b of the antenna element 2 is wider than the main surface 11b. Therefore, the area of the main surface 3a is larger than the area of the main surface 11b. In the first embodiment, the center of the shielding plate 3 and the center of the antenna element 2 overlap in the Z direction, and an edge 3b of the shielding plate 3 is located outside an edge 2a of the antenna element 2 in a plan view. For example, in a plan view, the dimension of the shielding plate 3 in the X direction is equal to or larger than the dimension of the antenna element 2 in the X direction, and the dimension of the shielding plate 3 in the Y direction is equal to or larger than the dimension of the antenna element 2 in the Y direction. The dimension of the shielding plate 3 in the X direction is, for example, 5 mm or more and 200 mm or less. The dimension of the shielding plate 3 in the Y direction is, for example, 50 mm or more and 1000 mm or less. When the shortest distance between the edge 2a of the antenna element 2 and the edge 3b of the shielding plate 3 in a plan view is set to, for example, 30 mm or more, the reception sensitivity of the antenna device 1 tends to be easily stabilized.

As the distance between the shielding plate 3 and the antenna element 2 in the Z direction decreases, the shielding performance of the shielding plate 3 tends to improve. On the other hand, as the distance between the shielding plate 3 and the antenna element 2 in the Z direction increases, the shielding performance of the shielding plate 3 tends to decrease. Therefore, as the distance between the shielding plate 3 and the antenna element 2 in the Z direction is reduced, the size of the shielding plate 3 in a plan view is made closer to the size of the antenna element 2 in a plan view. In other words, as the distance between the shielding plate 3 and the antenna element 2 along the Z direction is reduced, the shortest distance between the edge 2a of the antenna element 2 and the edge 3b of the shielding plate 3 in a plan view can be made closer to 0 mm. Therefore, when the distance between the shielding plate 3 and the antenna element 2 in the Z direction is narrowed, the reception sensitivity of the antenna device 1 can be favorably stabilized even if the shortest distance between the edge 2a of the antenna element 2 and the edge 3b of the shielding plate 3 in a plan view is less than 30 mm, for example.

The shielding plate 3 has a first plate portion 21, a second plate portion 22, a third plate portion 23 and a bracket portion 24. The first plate portion 21 is located between the second plate portion 22 and the third plate portion 23 in the X direction. The first plate portion 21 and the second plate portion 22 are connected to each other via a bent portion 3c extending along the Y direction, and the first plate portion 21 and the third plate portion 23 are connected to each other via a bent portion 3d extending along the Y direction. Each of an angle θ1 formed by the first plate portion 21 and the second plate portion 22 and an angle θ2 formed by the first plate portion 21 and the third plate portion 23 is, for example, 225 degrees or less. When the angle θ1 is 180 degrees, the bent portion 3c is not provided in the shielding plate 3.

The first plate portion 21 is a plate-shaped portion extending in parallel to the element portion 11 of the antenna element 2, and has an substantially rectangular shape in a plan view. The circuit substrate 4 and the other ends of the insulating members 5A and 5B are fixed to the first plate portion 21. The dimension of the first plate portion 21 in the X direction is, for example, 10 mm or more and 260 mm or less. The dimension of the first plate portion 21 in the Y direction is, for example, 100 mm or more and 1000 mm or less. In the same manner as the first plate portion 21, the second plate portion 22 and the third plate portion 23 have an substantially rectangular shape. The dimension of the second plate portion 22 in the Y direction is the same as the dimension of the first plate portion 21 in the Y direction. On the other hand, the dimension of the third plate portion 23 in the Y direction is shorter than the dimension of the first plate portion 21 in the Y direction. One short side 23a of the third plate portion 23 extends continuously from one short side 21a of the first plate portion 21, while the other short side 23b of the third plate portion 23 is located closer to the short side 21a than the other short side 21b of the first plate portion 21.

The bracket portion 24 is a portion of the shielding plate 3 that is attached to the vehicle or an exterior component of the vehicle. The bracket portion 24 is directly attached to the vehicle or the exterior component of the vehicle. Alternatively, another conductive bracket or the like is attached to the bracket portion 24. In the latter case, the other conductive bracket is attached to the vehicle, whereby the antenna device 1 is mounted to the vehicle. Similarly to the third plate portion 23, the bracket portion 24 is connected to the first plate portion 21 via the bent portion 3d. The bracket portion 24 is positioned closer to the short side 21a than the short side 21b of the first plate portion 21 and closer to the short side 21b side than the short side 23b of the third plate portion 23 in the Y direction. Therefore, the bracket portion 24 and the third plate portion 23 are separated from each other. The bracket portion 24 is provided with, for example, an opening 24a into which a fixing member such as a fastening member is inserted.

The circuit substrate 4 is a member (amplifier) for amplifying the radio frequency power received by the antenna element 2, and is provided on the main surface 3a of the shielding plate 3. The circuit substrate 4 includes a substrate portion 31 on which a wiring pattern and a ground pattern (not shown) are formed, and an amplifier circuit 32 provided on the substrate portion 31. The substrate portion 31 is attached to the main surface 3a of the shielding plate 3 via a plurality of fixing members 41 and has an substantially rectangular plate shape. The substrate portion 31 is, for example, a plate-like member disposed in parallel to the shielding plate 3. The substrate portion 31 has a main surface 31a facing the main surface 11b of the antenna element 2 in the Z direction and a main surface 31b facing the first plate portion 21 of the shielding plate 3 in the Z direction. In a plan view, the main surface 31a of the substrate portion 31 is smaller than the main surfaces 11a and 11b of the antenna element 2 and overlaps at least a part of the main surface 11b. A power supply portion 12 is provided at a position where the main surface 31a and the main surface 11b overlap each other in the Z direction, and the power supply portion 12 is electrically connected to the wiring pattern of the substrate portion 31. The amplifier circuit 32 is a kind of integrated circuit and is provided on the main surface 31b of the substrate portion 31. Although not shown, in the first embodiment, all integrated circuits and capacitors other than the amplifier circuit 32 are provided on the main surface 31b. In addition, the cable 6 is connected to the wiring pattern on the main surface 31b. From the viewpoint of downsizing the antenna device 1 while maintaining the electrical length of the antenna device 1, the circuit substrate 4 may include an inductor electrically connected to the wiring pattern of the circuit substrate 4 and the power supply portion 12. The inductor may be, for example, an air-core coil. When the circuit substrate 4 includes an inductor, the inductor is preferably provided on the main surface 31a from the viewpoint of loss reduction. When the inductor is a coil, the axis of the coil may be parallel to the shielding plate 3 or may intersect or be orthogonal to the shielding plate 3. In the first embodiment, the fixing member 41 is a fastening member. However, the fixing member 41 is not limited thereto.

Each of the insulating members 5A and 5B is a member for integrating the antenna element 2 and the shielding plate 3, and has a rod shape. The insulating members 5A and 5B are located between the main surface 11b of the antenna element 2 (the element portion 11) and the main surface 3a of the shielding plate 3 (more specifically, the first plate portion 21), and are separated from each other. The insulating members 5A and 5B are separated from the circuit substrate 4. Each of the insulating members 5A and 5B is formed of, for example, polypropylene (PP) or the like.

The dimension of the insulating members 5A and 5B in the Z direction corresponds to the distance between the shielding plate 3 and the antenna element 2 along the Z direction. In other words, the distance between the shielding plate 3 and the antenna element 2 in the Z direction is determined by the dimensions of the insulating members 5A and 5B in the Z direction. From the viewpoint of suppressing variation in the distance between the antenna element 2 and the shielding plate 3 in the Z direction, the insulating member 5A is located on the short side 21a side of the center of the first plate portion 21 in the Y direction, and the insulating member 5B is located between the insulating member 5A and the circuit substrate 4 in the Y direction. Each of the insulating members 5A and 5B preferably overlaps a center line of the antenna element 2 along the Y direction. From the viewpoint of reducing the loss due to the insulating members 5A and 5B, the diameter of the insulating members 5A and 5B is preferably small.

Figure 4A:
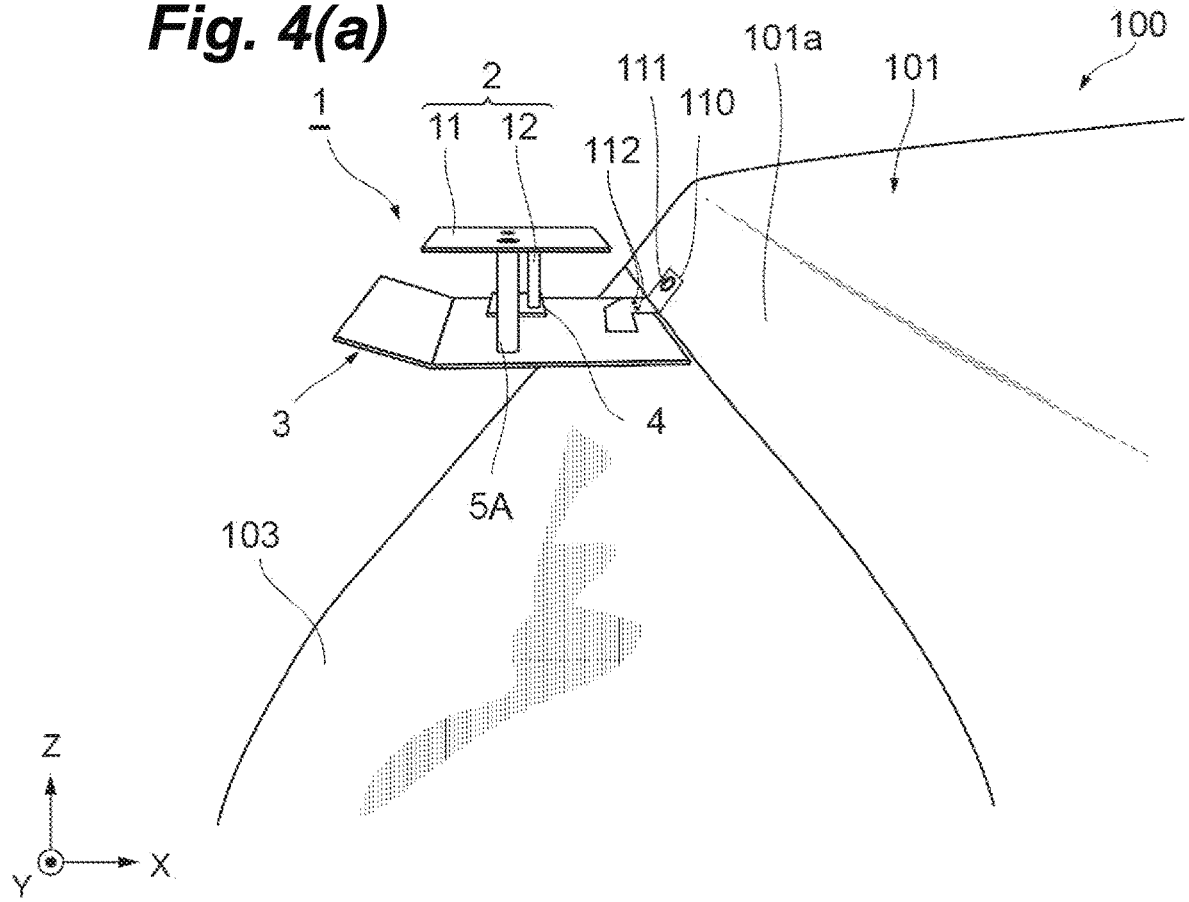
FIGS. 4(a) and 4(b) are diagrams showing a state in which the antenna device shown
Figure 4B:
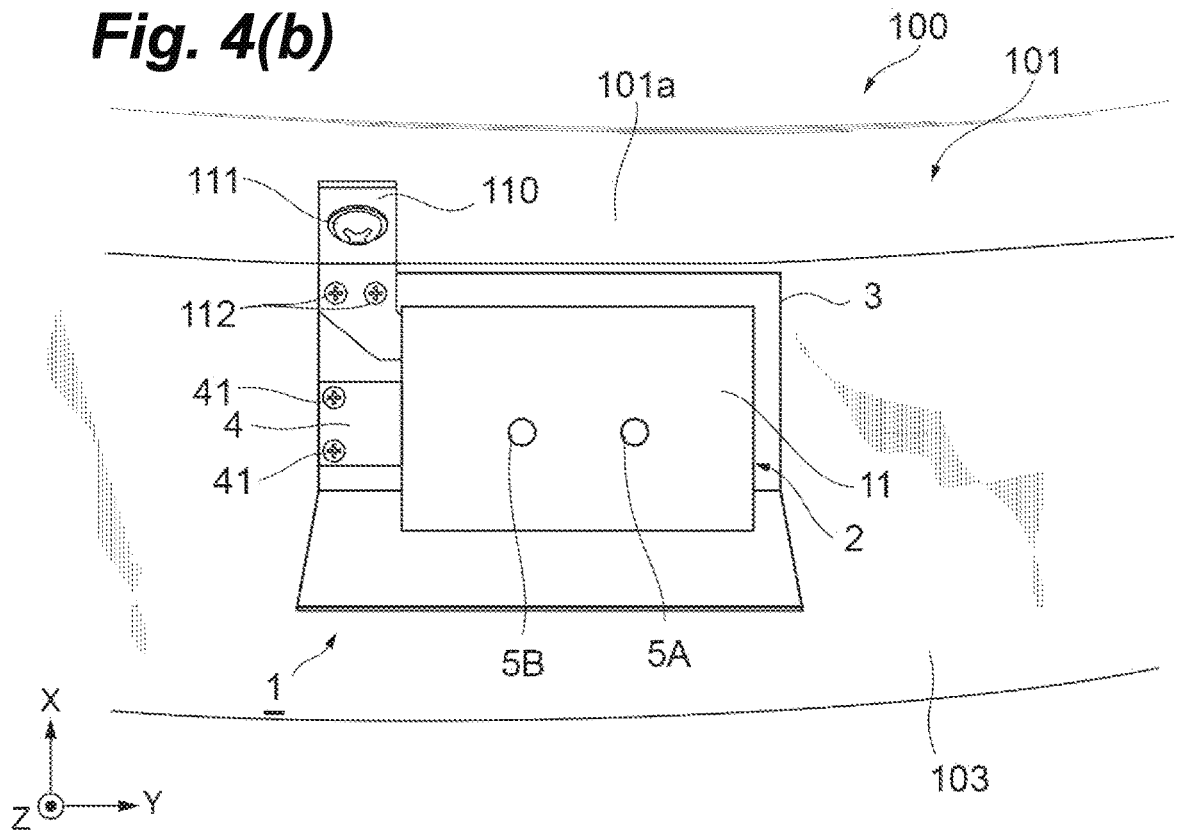

Next, the operation and effect of the antenna device 1 according to the first embodiment will be described with reference to the mounting state of the antenna device 1 on the vehicle shown in FIG. 3 and FIGS. 4(a) and 4(b). FIG. 3 is a diagram illustrating a mounted state of an antenna device according to the first embodiment. FIGS. 4(a) and 4(b) are diagrams showing a state in which the antenna device shown in FIG. 3 is exposed. In the antenna device 1 shown in FIG. 3 and FIGS. 4(a) and 4(b), the bent portion 3d is not formed unlike the embodiment shown in FIG. 1 and FIGS. 2(a) and 2(b).

As shown in FIG. 3 and FIGS. 4(a) and 4(b), the antenna device 1 is mounted on a vehicle body 101 of a vehicle 100. Specifically, the shielding plate 3 of the antenna device 1 is attached to the back door 101a of the vehicle body 101 via a bracket 110 made of a metal or an alloy having an substantially L-shaped plate shape and fastening members 111, 112 having conductivity. The antenna device 1 is installed in a rear spoiler 120 made of insulating resin. The shielding plate 3 is located above the rear glass 103 and near the vehicle body 101. The distance between the shielding plate 3 and the vehicle body 101 is, for example, 0 mm or more and 20 mm or less. In addition, the antenna element 2 is located above the shielding plate 3. Therefore, the shielding plate 3 is located between the vehicle 100 and the antenna element 2. The antenna element 2 shown in FIG. 3 is located below the roof 101b, but is not limited thereto. When the antenna element 2 does not overlap the roof 101b in the Z direction, the antenna element may be located above the roof 101b.

According to the antenna device 1 mounted on the vehicle body 101 as described above, the shielding plate 3 is located between the antenna element 2 and the rear lamp 102, which is one of the noise sources in the vehicle 100. Therefore, even when a metal member (for example, roof 101b or the like) of the vehicle 100 is not disposed between the antenna element 2 and the rear lamp 102 that is the noise source in the vehicle 100, the shielding plate 3 prevents noise generated by the noise source from entering the antenna element 2. The shielding plate 3 is also located between the rear glass 103 and the antenna element 2. Therefore, noise generated from a noise source (for example, an inverter, a motor, a room lamp, or the like) provided inside the vehicle body 101 and emitted to the outside of the vehicle 100 via the rear glass 103 is also less likely to enter the antenna element 2 due to the presence of the shielding plate 3. Therefore, since the shape and arrangement of the antenna device 1 are less likely to be limited by the shape of the metal member or the like of the vehicle 100, the degree of freedom in arrangement and design of the antenna device 1 can be increased.

In addition, the antenna element 2 and the shielding plate 3 are separated from the circuit substrate 4 and integrated with each other via insulating members 5A and 5B located between the main surface 11b and the main surface 3a. As a result, since the distance between the antenna element 2 and the shielding plate 3 in the Z direction is favorably maintained by the insulating members 5A and 5B, the shielding plate 3 can be set as the conductive member closest to the antenna element 2. For this reason, the influence of the shielding plate 3 on the antenna performance (for example, the resonance frequency and the reception sensitivity) becomes dominant, and the capacitance change of the antenna element 2 before and after attachment to the vehicle 100 becomes small. Therefore, the antenna performance can be easily stabilized. Furthermore, since the antenna element 2 and the shielding plate 3 are firmly fixed to each other by the insulating members 5A and 5B, damage to the power supply portion 12 caused by vibration of the vehicle and adverse effects such as noise due to sub-resonance caused by the vibration can be reduced.

In the first embodiment, the circuit substrate 4 may be smaller than the main surfaces 11a and 11b of the antenna element 2 in a plan view. In this case, the influence of the circuit substrate 4 on the antenna performance is reduced.

In the first embodiment, the shielding plate 3 may be directly attached to a metal member of the vehicle 100. In this case, when the antenna device 1 is fixed to the vehicle 100, the shielding plate 3 is reliably grounded by the metal member of the vehicle 100. Therefore, even when the antenna element 2 is located in the vicinity of the metal member of the vehicle 100, the antenna element 2 is less likely to be affected by the metal member. Therefore, it is possible to suppress a change in the resonance frequency of the antenna device 1 before and after the antenna device 1 is attached to the vehicle 100.

Here, the reason why the resonance frequency of the antenna device 1 of the first embodiment is less likely to change due to the influence of the metal member of the vehicle 100 will be described in detail with reference to a first comparative example described below. Unlike the antenna device 1, an antenna device of the first comparative example is a monopole antenna that does not include the shielding plate 3 and the insulating members 5A and 5B. Therefore, when the antenna device of the first comparative example is mounted on a vehicle, for example, the vehicle body is a conductive member closest to the antenna element. The antenna device of the first comparative example is mounted on the vehicle via a bracket in the same manner as in the mounting state described above. In the first comparative example, one end of the bracket is attached to the vehicle, and the other end of the bracket is attached to the circuit substrate. The resonance frequency set in the antenna device of the first comparative example is 92 MHz as in the first embodiment.

Table 1 below shows the relationship of the resonance frequency to a distance between the antenna device 1 according to the first embodiment and the vehicle, and the relationship of the resonance frequency to the distance between the antenna device according to the first comparative example and the vehicle. In Table 1 below, the distance between the antenna device and the vehicle being 0 mm means that at least a part of the antenna device is in contact with the vehicle. The distance between the antenna device and the vehicle being 10 mm means that the shortest distance between the antenna device and the vehicle is 10 mm.

TABLE 1

| DISTANCE BETWEEN ANTENNA DEVICE AND VEHICLE (mm) | FIRST EMBODIMENT RESONANCE FREQUENCY (MHz) | FIRST COMPARATIVE EXAMPLE RESONANCE FREQUENCY (MHz) |
|---|---|---|
| 0 | 92 | 81 |
| 10 | 92 | 90 |
| 20 | 92 | 90 |
| 30 | 92 | 91 |
| 40 | 92 | 92 |
| 50 | 92 | 92 |
| 60 | 92 | 92 |
| 70 | 92 | 92 |
| 80 | 92 | 92 |
| 90 | 92 | 92 |
| 100 | 92 | 92 |

As shown in Table 1, in the first comparative example, when the distance between the antenna device and the vehicle is less than 40 mm, the resonance frequency of the antenna device deviates from the set value of 92 MHz. On the other hand, in the first embodiment, regardless of the distance between the antenna device 1 and the vehicle, the resonance frequency of the antenna device 1 indicates 92 MHz which is the set value. From Table 1, it can be seen that, by providing the antenna device 1 with the shielding plate 3 and the insulating members 5A and 5B unlike the first comparative example, the influence of the shielding plate 3 on the antenna performance becomes dominant, and the antenna performance (in particular, the resonance frequency) can be easily stabilized even when the antenna element 2 is located near a metal member of the vehicle 100.

In the first embodiment, at least one of the antenna element 2 and the shielding plate 3 may have flexibility. In this case, for example, at least one of the antenna element 2 and the shielding plate 3 can be easily deformed into a shape along the inner surface of the rear spoiler 120. Thus, the antenna device 1 can be easily accommodated in the vehicle 100 or the like.

The antenna device 1 according to the first embodiment is installed in an exterior component of the vehicle 100. A metal member capable of shielding noise may not be disposed between the exterior component of vehicle 100 and a noise source in vehicle 100. Even in such a case, the noise can be suitably shielded from entering the antenna element 2 by the shielding plate 3. Therefore, even when the antenna device 1 is installed in an exterior component of the vehicle 100, the antenna performance of the antenna device 1 can be suitably exhibited.

In the first embodiment, in a plan view, the dimension of the shielding plate 3 in the X direction is equal to or larger than the dimension of the antenna element 2 in the X direction, and the dimension of the shielding plate 3 in the Y direction is equal to or larger than the dimension of the antenna element 2 in the Y direction. In this case, the reception sensitivity of the antenna device 1 can be favorably stabilized. Here, when the shortest distance between the edge 2a of the antenna element 2 and the edge 3b of the shielding plate 3 in a plan view (hereinafter, simply referred to as "shortest distance") is, for example, 30 mm or more, the reception sensitivity of the antenna device 1 tends to be more favorably stabilized.

Figure 5:
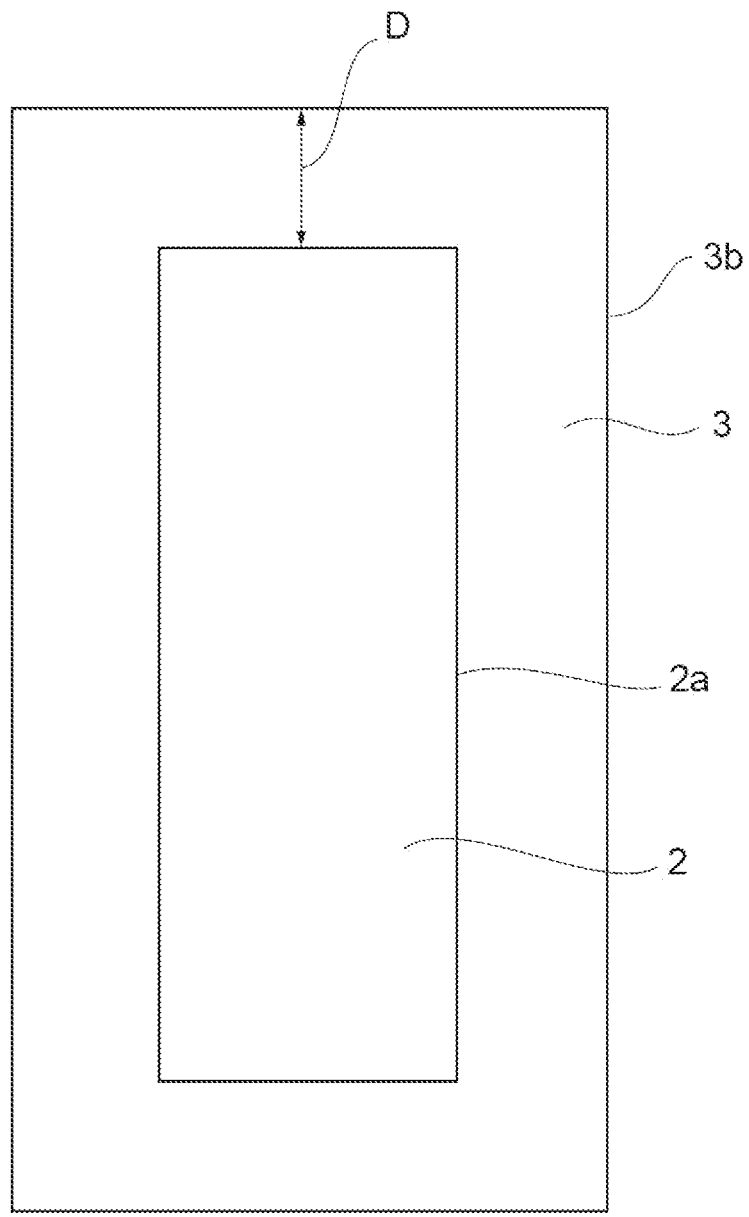
FIG. 5 is a schematic plan view of the antenna device.
Figure 6:
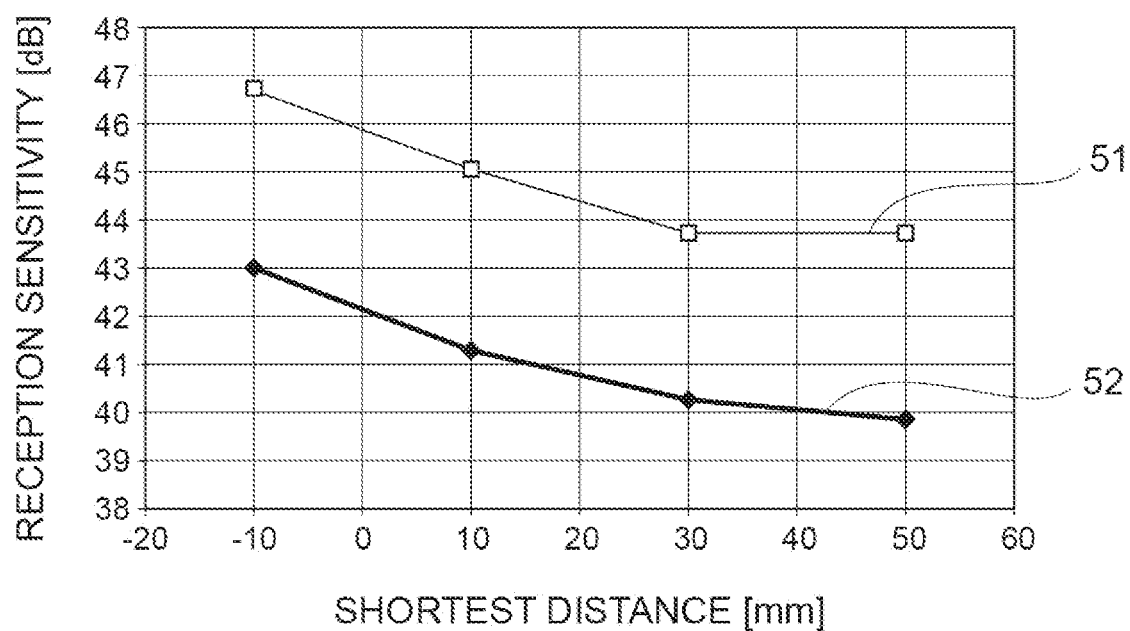
FIG. 6 is a diagram showing the variation rate of the reception sensitivity with respect to the shortest distance between an edge of the antenna element and an edge of the shielding plate.

Here, with reference to FIGS. 5 and 6, the variation rate of the reception sensitivity of the antenna device according to the dimensions of the antenna element and the shielding plate will be considered. FIG. 5 is a schematic plan view of the antenna device. FIG. 5 shows a rectangular plate-shaped antenna element 2 and shielding plate 3 for simplification. The dimension of the antenna element 2 shown in FIG. 5 in the X direction is 50 mm, and the dimension in the Y direction is 130 mm. The distance between the shielding plate 3 and the antenna element 2 in the Z direction is within the above-described range. Arrow D indicates the shortest distance between the edge 2a of the antenna element 2 and the edge 3b of the shielding plate 3 in a plan view. FIG. 6 is a diagram showing the variation rate of the reception sensitivity with respect to the shortest distance. In FIG. 6, the vertical axis represents the reception sensitivity of the antenna device, and the horizontal axis represents the shortest distance. When the shortest distance is a negative value, it indicates that the edge 3b is located inside edge 2a in a plan view. In FIG. 6, the graph 51 shows the measurement result of the vertically polarized wave, and the graph 52 shows the measurement result of the horizontally polarized wave.

According to the graph 51 shown in FIG. 6, when the shortest distance is less than 30 mm, the reception sensitivity varies with a change in the shortest distance. On the other hand, when the shortest distance is 30 mm or more, the reception sensitivity does not substantially change even if the shortest distance changes. According to the graph 52 shown in FIG. 6, the variation rate of the reception sensitivity when the shortest distance is 30 mm or more is smaller than the variation rate of the reception sensitivity when the shortest distance is less than 30 mm. From these results, it can be seen that the reception sensitivity of the antenna device is stabilized when the shortest distance is 30 mm or more. In addition, since the shortest distance is 30 mm or more, it can be easily estimated that noise from the shielding plate 3 side toward the antenna element 2 is well shielded by the shielding plate 3.

Second Embodiment

The antenna device according to the second embodiment will be described below. In the description of the second embodiment, the redundant description with the first embodiment will be omitted, and portions different from the first embodiment will be described. That is, the description of the first embodiment may be appropriately applied to the second embodiment within a technically possible range.

Figure 7:
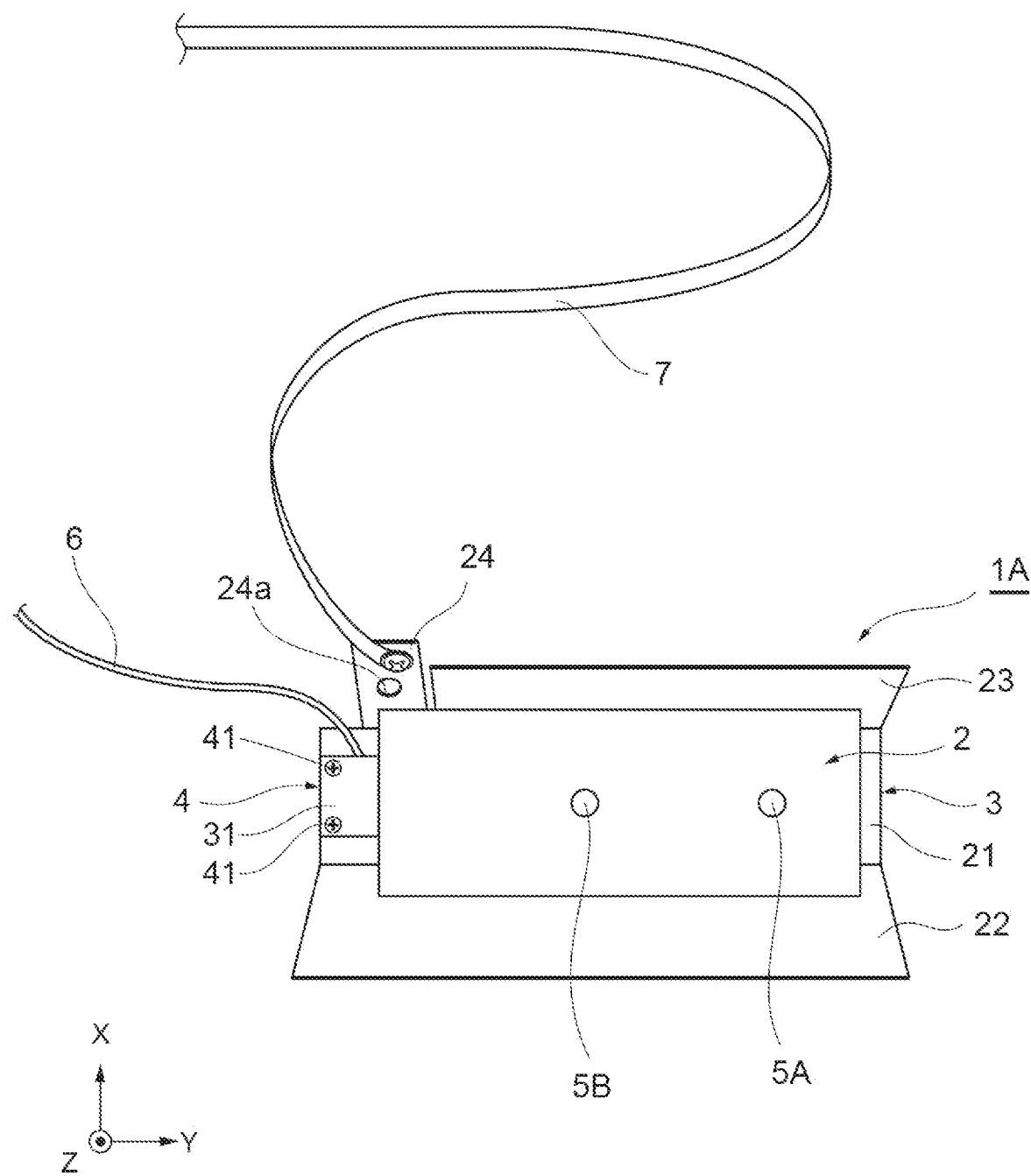
FIG. 7 is a schematic plan view of the antenna device according to the second embodiment.

FIG. 7 is a plan view of the antenna device according to the second embodiment. The antenna device 1A shown in FIG. 7 includes a ground wire 7 electrically connected to the shielding plate 3 in addition to the configuration of the antenna device 1 according to the first embodiment. One end of the ground wire 7 is fixed to the bracket portion 24 of the shielding plate 3. When the antenna device 1A is attached to the vehicle 100, the other end of the ground wire 7 is electrically connected to, for example, any part of the vehicle body 101. The resonance frequency of the antenna device according to the second embodiment is set to 92 MHz as in the first embodiment.

From the viewpoint of stabilizing the resonance frequency in the antenna device 1A and from the viewpoint of noise shielding performance by the shielding plate 3, the length of the ground wire 7 is preferably short. From the former viewpoint, the length of the ground wire 7 may be, for example, 15 cm or less. From the latter viewpoint, the length of the ground wire 7 may be, for example, 10 cm or less. The ground wire 7 may be longer than 15 cm as long as it is a short stub with respect to the frequency band of the radio wave received by the antenna device 1A (for example, a length of λ/4 with respect to the frequency in the frequency band). In the second embodiment, the length of the ground wire 7 is 70 cm or more and 100 cm or less from the viewpoint that the antenna device 1A receives at least the FM waveband. The FM waveband corresponds to, for example, a range from 76 MHz to 108 MHz.

The antenna device 1A according to the second embodiment described above can also achieve the same effect as that of the first embodiment. The antenna device 1A includes a ground wire 7 electrically connected to the shielding plate 3. Therefore, even when the shielding plate 3 of the antenna device 1A cannot be directly grounded to a metal member of the vehicle, the shielding plate 3 can be grounded via the ground wire 7. In addition, by adjusting the length of the ground wire 7, a variation of the resonance frequency of the antenna device 1 due to the ground wire 7 can be suppressed. In the second embodiment, since the length of the ground wire 7 is 70 cm or more and 100 cm or less, the variation of the resonance frequency of the antenna device 1 due to the ground wire and the influence of the ground wire 7 on the noise shielding performance of the shielding plate 3 are particularly suppressed in the FM waveband. Furthermore, the position where the antenna device 1A is disposed is less likely to be limited by the position where the ground wire 7 is attached to the vehicle. Therefore, it is possible to further increase the freedom of arrangement of the antenna device 1A.

Here, with reference to a second comparative example described below, the operation and effect achieved by the antenna device 1A of the second embodiment will be described in detail. The antenna device of the second comparative example is a monopole antenna that does not include the shielding plate 3 and the insulating members 5A and 5B similarly to the first comparative example, and includes a ground wire connected to the circuit substrate. The resonance frequency set in the antenna device of the second comparative example is 92 MHz as in the second embodiment.

Table 2 shows the relationship between the length of the ground wire and a measured resonance frequency and peak sensitivity of the antenna device in each of the second embodiment and the second comparative example. In Table 2, a ground wire having the length of 0 cm indicates a state in which the antenna device does not include a ground wire.

TABLE 2

| LENGTH OF GROUND WIRE (cm) | SECOND EMBODIMENT | | SECOND COMPARATIVE EXAMPLE | |
|---|---|---|---|---|
| | RESONANCE FREQUENCY (MHz) | PEAK SENSITIVITY (dB) | RESONANCE FREQUENCY (MHz) | PEAK SENSITIVITY (dB) |
| 0 | 91 | 35 | 90 | 37 |
| 10 | 91 | 35 | 88 | 38 |
| 15 | 91 | 37 | 87 | 38 |
| 20 | 90 | 37 | 86 | 38 |
| 30 | 82 | 38 | 78 | 38 |
| 40 | 92 | 32 | 72 | 38 |
| 50 | 92 | 33 | 70 | 38 |
| 60 | 92 | 34 | 69 | 37 |
| 70 | 92 | 34 | 104 | 30 |
| 80 | 91 | 35 | 102 | 32 |
| 90 | 92 | 35 | 100 | 33 |
| 100 | 92 | 35 | 99 | 32 |
| 110 | 92 | 35 | 94 | 37 |
| 120 | 91 | 35 | 97 | 37 |
| 130 | 91 | 35 | 92 | 37 |
| 140 | 91 | 35 | 89 | 38 |
| 150 | 89 | 35 | 87 | 35 |
| 160 | 88 | 35 | 87 | 34 |
| 170 | 87 | 34 | 87 | 33 |
| 180 | 85 | 33 | 85 | 33 |

As shown in Table 2, in the second comparative example, the resonance frequency tends to vary greatly as the length of the ground wire change. In the second comparative example, a length of the ground wire exhibiting the set resonance frequency (92 MHz) is only 130 cm. On the other hand, in the second embodiment, the resonance frequency tends to be less likely to vary even when the length of the ground wire is changed. In the second embodiment, the length of the ground wires exhibiting 92 MHz or 91 MHz in the vicinity thereof are 0 cm to 15 cm and 40 cm to 140 cm. In addition, the peak sensitivity in the second embodiment tends to be less likely to vary than in the second comparative example. From the result of Table 2, it can be seen that when the ground wire 7 is attached to the antenna device 1A having the shielding plate 3, the resonance frequency and the peak sensitivity tend to be less likely to vary than when the shielding plate 3 is not provided.

Table 3 below shows the relationship between the length of the ground wire 7 and the noise shielding performance of the shielding plate 3 in the second embodiment. In Table 3, a ground wire having a length of 0 cm indicates a state in which the antenna device does not include a ground wire. A shield amount shown in Table 3 indicates the difference between the peak sensitivity of the antenna device 1A when noise is radiated from the antenna element 2 side and the peak sensitivity of the antenna device 1A when noise is radiated from the shielding plate 3 side along the Z direction shown in FIG. 7. The larger the shielding amount shown in Table 3, the higher the noise shielding performance of the shielding plate 3.

TABLE 3

| LENGTH OF GROUND WIRE (cm) | SHIELDING AMOUNT (dB) |
| --- | --- |
| 0 | 17 |
| 10 | 14 |
| 15 | 5 |
| 20 | 2 |
| 30 | −2 |
| 40 | 2 |
| 50 | 7 |
| 60 | 10 |
| 70 | 14 |
| 80 | 16 |
| 90 | 15 |
| 100 | 12 |
| 110 | 10 |
| 120 | 5 |
| 130 | 7 |
| 140 | 7 |
| 150 | 7 |

As shown in Table 3, when the length of the ground wire 7 is 10 cm or less, the shielding amount exceeds 10 dB. Further, the shielding amount is larger when the length of the ground wire 7 is 10 cm than when the length of the ground wire 7 is 15 cm. From this result, it can be seen that as the length of the ground wire 7 becomes shorter, the noise blocking performance of the shielding plate 3 becomes higher. In addition, when the length of the ground wire 7 is 70 cm or more and 100 cm or less, the shielding amount exceeds 10 dB. This result shows that when the length of the ground wire 7 is 70 cm or more and 100 cm or less, the influence of the ground wire 7 on the noise shielding performance of the shielding plate 3 is particularly suppressed in the FM waveband including the set resonance frequency (92 MHz).

The antenna device according to the present invention is not limited to the above-described embodiment, and various modifications are possible. In the above-described first and second embodiments, the antenna element 2 has a substantially rectangular shape in a plan view, but is not limited thereto. For example, the antenna element 2 may have a circular shape or a polygonal shape in a plan view. The antenna element 2 is not limited to the plate-like structure, and may have a meander structure, a net-like structure, or the like. From the viewpoint of structurally facilitating the grounding to a metal member of the vehicle, the element portion 11 of the antenna element 2 may be provided, for example, on the substrate or may have a film shape. In the former case, the element portion 11 and the amplifier can be integrally formed. In the latter case, the shape of the element portion 11 can be easily changed. In addition, in the latter case, the element portion 11 may be covered with a protective film. In this case, moisture can be prevented from adhering to the element portion 11. The power supply portion 12 of the antenna element 2 may be formed of the same conductive member as the element portion 11. That is, the power supply portion 12 may be formed of the same metal plate or alloy plate as the element portion 11. The resonance frequency of the antenna element 2 is not limited to 92 MHz or the FM waveband.

Figure 8:
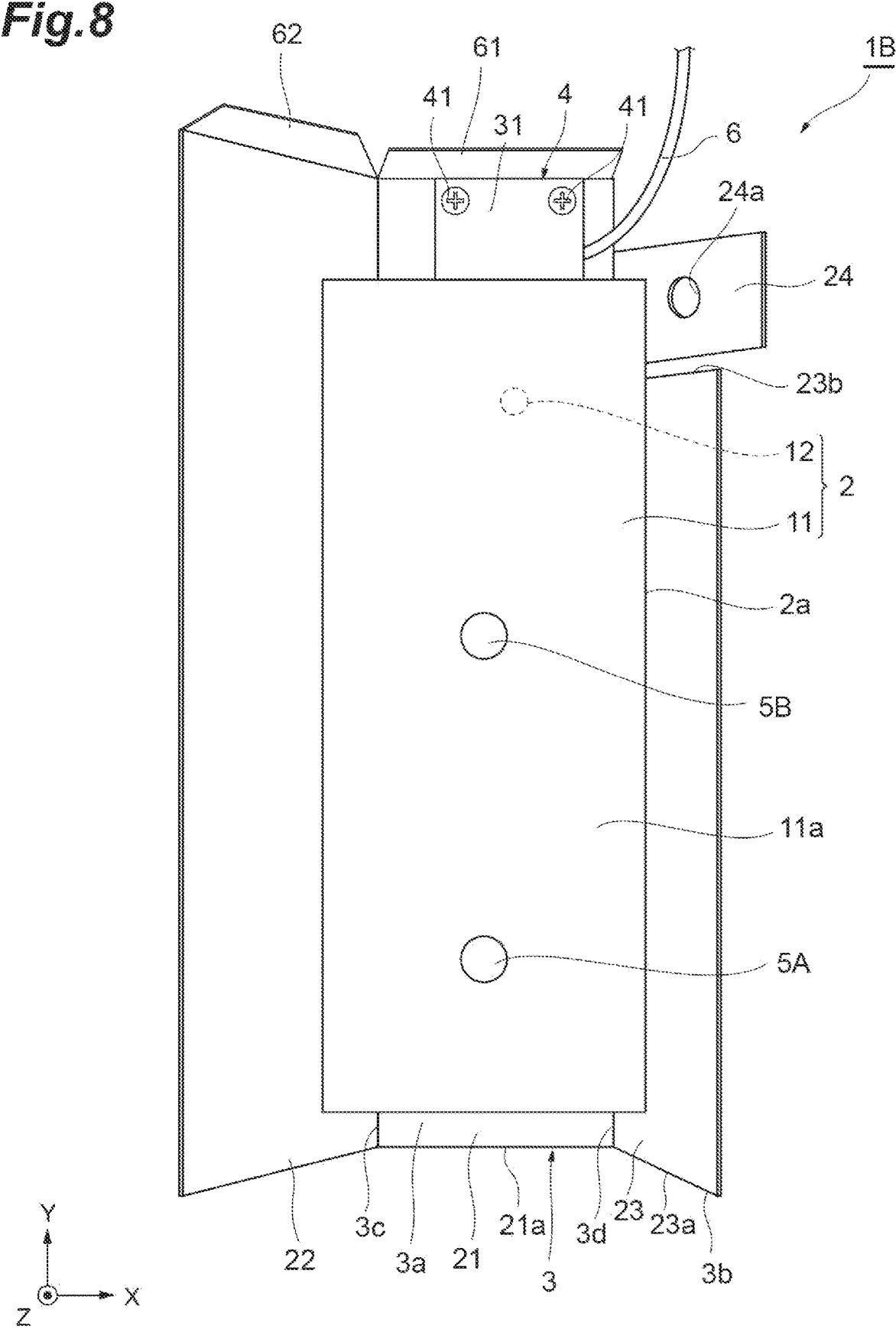
FIG. 8 is a schematic plan view of the antenna device according to the first modified example.

In the above first and second embodiments, the shielding plate 3 is provided with one or more bent portions, but is not limited thereto. FIG. 8 is a schematic plan view of the antenna device according to a first modified example. The antenna device 1B shown in FIG. 8 further includes a fourth plate portion 61 extending from the first plate portion 21 and a fifth plate portion 62 extending from the second plate portion 22. Each of the fourth plate portion 61 and the fifth plate portion 62 is provided near the circuit substrate 4. The fourth plate portion 61 is provided by bending the first plate portion 21, and the fifth plate portion 62 is provided by bending the second plate portion 22. In this first modified example, the fourth plate portion 61 and the fifth plate portion 62 are bent so that the tips of the fourth plate portion 61 and the fifth plate portion 62 approach the antenna element 2. The fourth plate portion 61 and the fifth plate portion 62 are separated from each other, but may be integrated with each other. By providing the fourth plate portion 61 and the fifth plate portion 62, the noise shielding performance of the shielding plate 3 can be improved. The first and second embodiments may be appropriately combined with the configurations of the first modified example. In addition, configurations other than the fourth plate portion 61 and the fifth plate portion 62 may be added to the first and second embodiments and the first modified example. For example, the shielding plate may include another plate portion extending from the third plate portion 23. Alternatively, the shielding plate 3 may not be provided with the bent portion. In addition, when the third plate portion 23 and the bracket portion 24 are provided on the shielding plate 3, they may be integrated with each other. In this case, since the gap between the third plate portion 23 and the bracket portion 24 is filled, the amount of noise reaching the antenna element 2 can be reduced. The shielding plate 3 may not be formed of a metal plate or an alloy plate. The shielding plate 3 may be formed of, for example, a net-like conductive member or a member coated with a conductive material. The member coated with the conductive material is formed by, for example, applying the conductive material, depositing the conductive material, or plating the conductive material to a resin plate-like member.

Figure 9A:
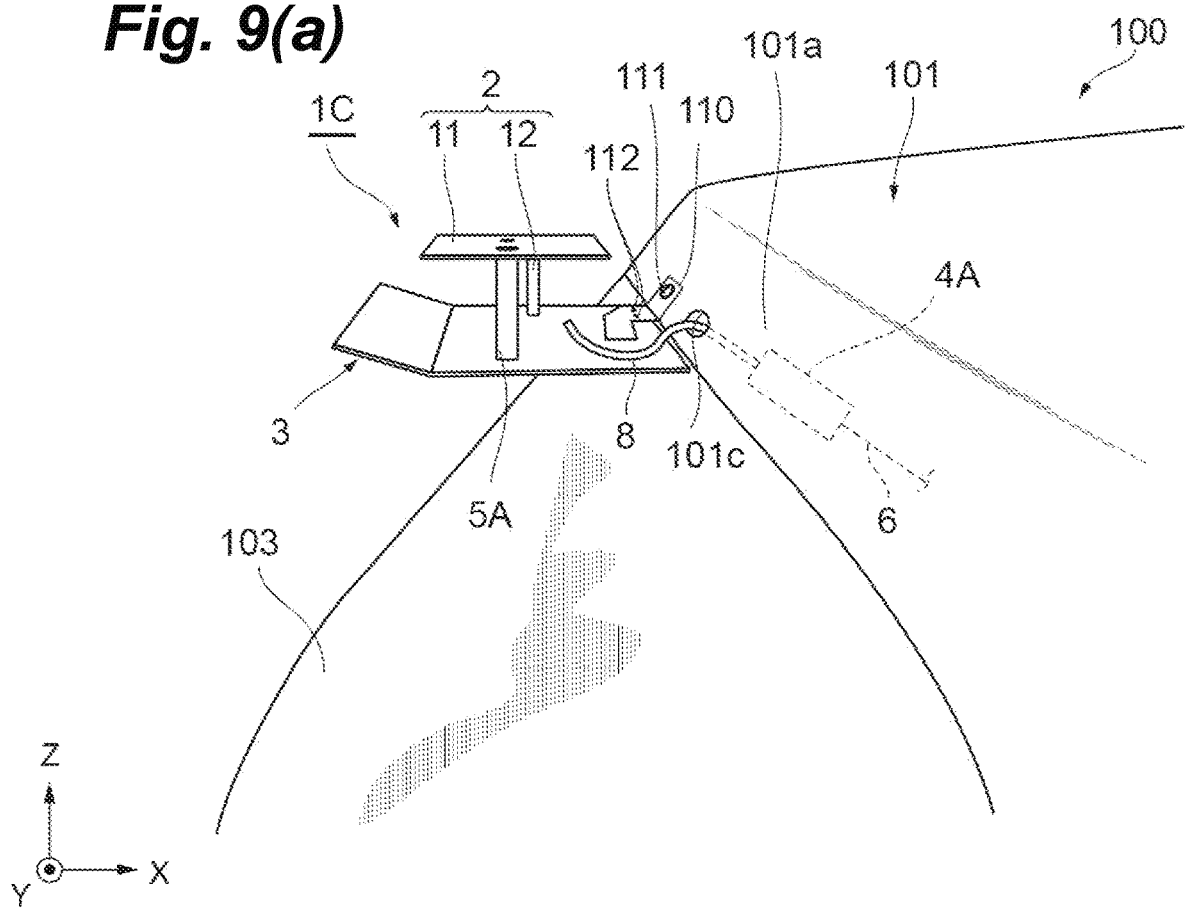
FIG. 9(a) is a diagram showing a state in which the antenna device according to the second modified example is mounted on the vehicle.

In the first and second embodiments, the circuit substrate 4 is fixed to the first plate portion 21 of the shielding plate 3 and located between the antenna element 2 and the shielding plate 3, but is not limited thereto. For example, the circuit substrate may be spaced apart from the antenna element 2 and the shielding plate 3. In this case, the circuit substrate may be a part of the antenna device or may be a device different from the antenna device. FIG. 9(a) is a diagram illustrating a state in which the antenna device according to the second modified example is mounted on a vehicle. As shown in FIG. 9(a), the circuit substrate 4A is accommodated in the vehicle 100. The circuit substrate 4A is electrically connected to at least one of the antenna element 2 and the shielding plate 3 via, for example, the cable 8. A part of the cable 8 is accommodated in the vehicle 100 via an opening 101c provided in the vehicle 100. The opening 101c is provided in a portion of vehicle 100 that is hidden by an exterior component. In such a second modified example, since the circuit substrate 4A can be disposed at a position not overlapping the antenna element 2 in a plan view, the distance between the shielding plate 3 and the antenna element 2 in the Z direction can be easily narrowed. As a result, the performance degradation of the antenna device 1C caused by the circuit substrate 4A can be suppressed, and the reception sensitivity of the antenna device 1C can be favorably stabilized. In addition, since the antenna device can be stored in a narrower space and the circuit substrate 4A can be easily protected from moisture or the like, the degree of freedom in arrangement of the antenna device 1C can be further improved. The first and second embodiments and the first modified example may be appropriately combined with the configurations of the second modified example.

Figure 9B:
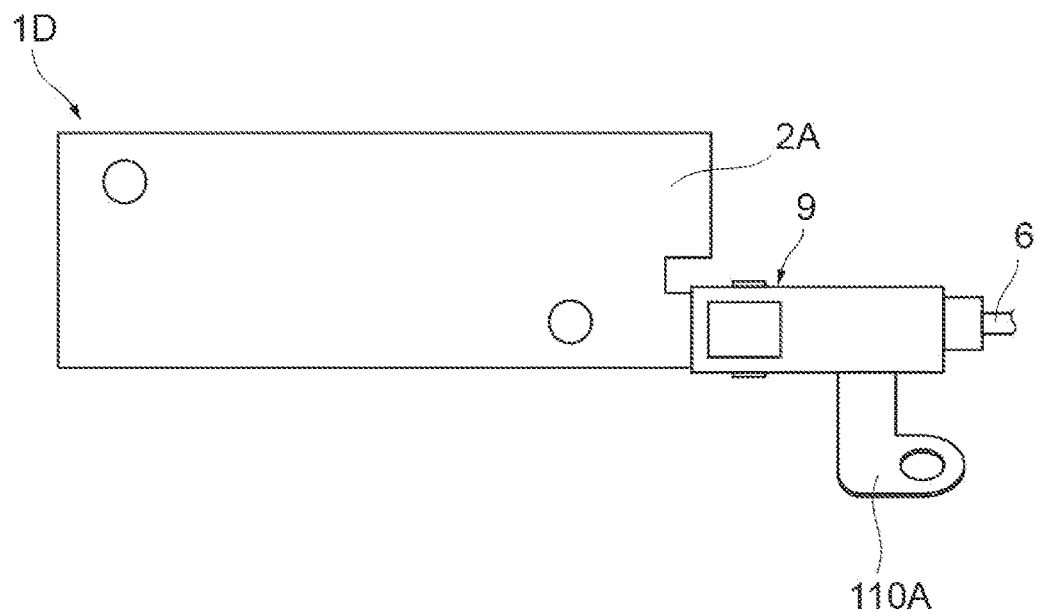
FIG. 9(b) is a schematic diagram of a part of the antenna device according to the third modified example.

The circuit substrate may be attached to the antenna element 2 instead of the shielding plate 3. FIG. 9(b) is a schematic diagram of a part of the antenna device according to the third modified example. In FIG. 9 (b), the shielding plate of the antenna device 1D according to the third modified example is omitted. The omitted shielded plate is located at least between the antenna element 2A and the noise source in the vehicle. The antenna element 2A according to the third modified example is a workpiece of a metallic plate or an alloy plate, but is not limited thereto. A cover 9 is attached to an end of the antenna element 2A. The cover 9 is, for example, a resin-molded product exhibiting an insulating property, and accommodates a circuit substrate electrically connected to the antenna element 2A. The circuit substrate in the cover 9 is connected to the bracket 110A and the cable 6A. In this third modified example, the same effects as those of the second modified example are achieved. The first and second embodiments and the first modified example may be appropriately combined with the aspect of the third modified example.

In the first and second embodiments and the first to third modified example, the circuit substrate is used as an amplifier, but is not limited thereto. For example, the circuit substrate may be used as a tuner (tuning circuit). Alternatively, the circuit substrate may have at least both the function of an amplifier and the function of a tuner. The ground pattern of the circuit substrate may not be connected to the shielding plate 3. For example, the ground pattern may be grounded via a cable.

In the first embodiment, the shortest distance between the edge 2a of the antenna element 2 and the edge 3b of the shielding plate 3 in a plan view is, for example, 30 mm or more, but is not limited thereto. For example, when the dimensions of the antenna element and the shielding plate in the directions X and Y exceed the above ranges, the shortest distance may be less than 30 mm. The cable 6 of the first embodiment may include a core wire electrically connected to the antenna element 2 and a braided wire provided around the core wire and electrically connected to the shielding plate 3. In this case, the cable 6 can also function as a ground wire for the shielding plate 3. As described in the second embodiment, by setting the length of the cable 6 to, for example, 15 cm or less, or 70 cm or more and 100 cm or less, the same effect as that of the second embodiment can be obtained. The length of the cable 6 may be appropriately changed according to the frequency of the radio wave received by the antenna element 2.

In the above-described first and second embodiments, the substrate portion 31 of the circuit substrate 4 is disposed parallel to the shielding plate 3, but is not limited thereto. The substrate portion 31 may be provided so as to intersect or be orthogonal to the shielding plate 3. In addition, the amplifier circuit 32 of the circuit substrate 4 is located between the shielding plate 3 and the substrate portion 31, but is not limited thereto. The amplifier circuit 32 may be located between the antenna element 2 and the substrate portion 31. That is, the amplifier circuit 32 may be provided on the main surface 31a. In this case, it is possible to improve the degree of freedom in designing the circuit substrate 4 and to reduce the thickness of the antenna device. All integrated circuits, capacitors, and inductors other than the amplifier circuit 32 may also be provided on the main surface 31a. This makes it possible to further reduce the thickness of the antenna device. In addition, the capacitance or the like may be provided on both of the main surfaces 31a and 31b.

Figure 10A:
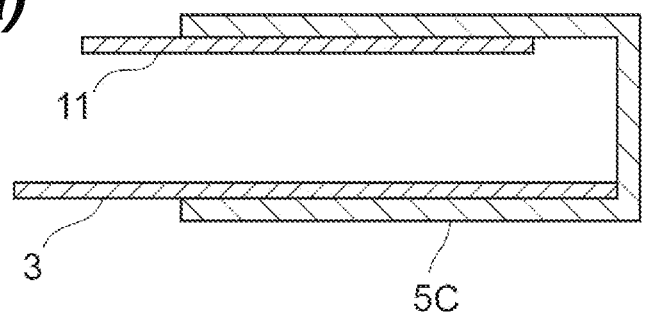
FIGS. 10(a), 10(b) and (10c) are sectional views showing a modified example of the insulating member.
Figure 10B:
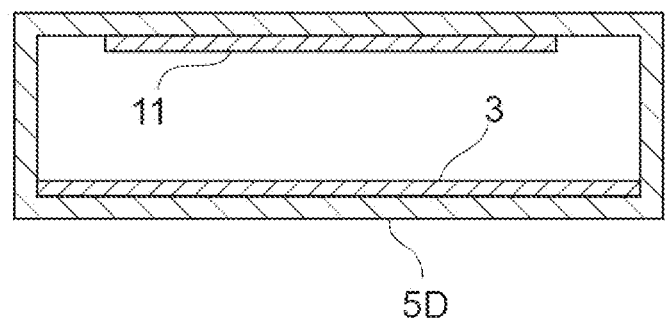
Figure 10C:
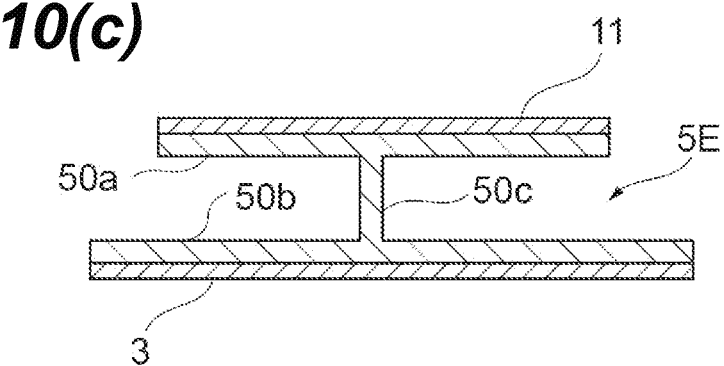

In the first and second embodiments, the antenna device includes 2 insulating members 5A and 5B, but is not limited thereto. The antenna device may include one insulating member or three or more insulating members. Further, the shape of the insulating member is not limited to a columnar shape, and may be any shape. For example, FIG. 10(c) shows an insulating member 5E having a substantially H-shaped cross-sectional shape. The insulating member 5E has a first portion 50a supporting the element portion 11, a second portion 50b fixed on the shielding plate 3, and a third portion 50c connecting the first portion 50a and the second portion 50b. In this manner, the element portion 11 is supported by the surface, so that a more stable structure is obtained. FIG. 10(a) shows an insulating member 5C having a substantially U-shaped cross-section shape. FIG. 10(b) shows an insulating member 5D having a substantially rectangular outer shape in a cross-sectional view and having an interior space. Thus, the element portion 11 and the shielding plate 3 may be held from the outside by the insulating member 5C or the insulating member 5D. The insulating member 5C and the insulating member 5D are fixed to the element portion 11 by, for example, screws or heat welding, but the fixing method is not limited thereto. With such a structure, since the antenna device can be integrally held, the antenna device can be easily attached to the vehicle and easily and carried.

In the first embodiment and the second embodiment, one antenna element is provided, but is not limited thereto. For example, the antenna device may include a plurality of antenna elements. In this case, the shielding plate may suppress noise from entering all the antenna elements, or may suppress noise from entering some of the antenna elements. For example, the shielding plate may suppress noise from entering an antenna element that receives radio waves of the lowest frequency among the plurality of antenna elements. Alternatively, the shielding plate may not suppress noise from entering an antenna element that receives radio waves of the highest frequency among the plurality of antenna elements. This is because the antenna device is more sensitive to noise generated in the vehicle as the frequency of the received radio wave is lower. For example, an antenna element for AM radio, an antenna element for FM radio, and the like are examples of an antenna element that receives a low-frequency radio wave. In addition, the antenna element that receives a radio wave of a low frequency may include an antenna element for DAB and an antenna element for BAND 3.

Figure 11:
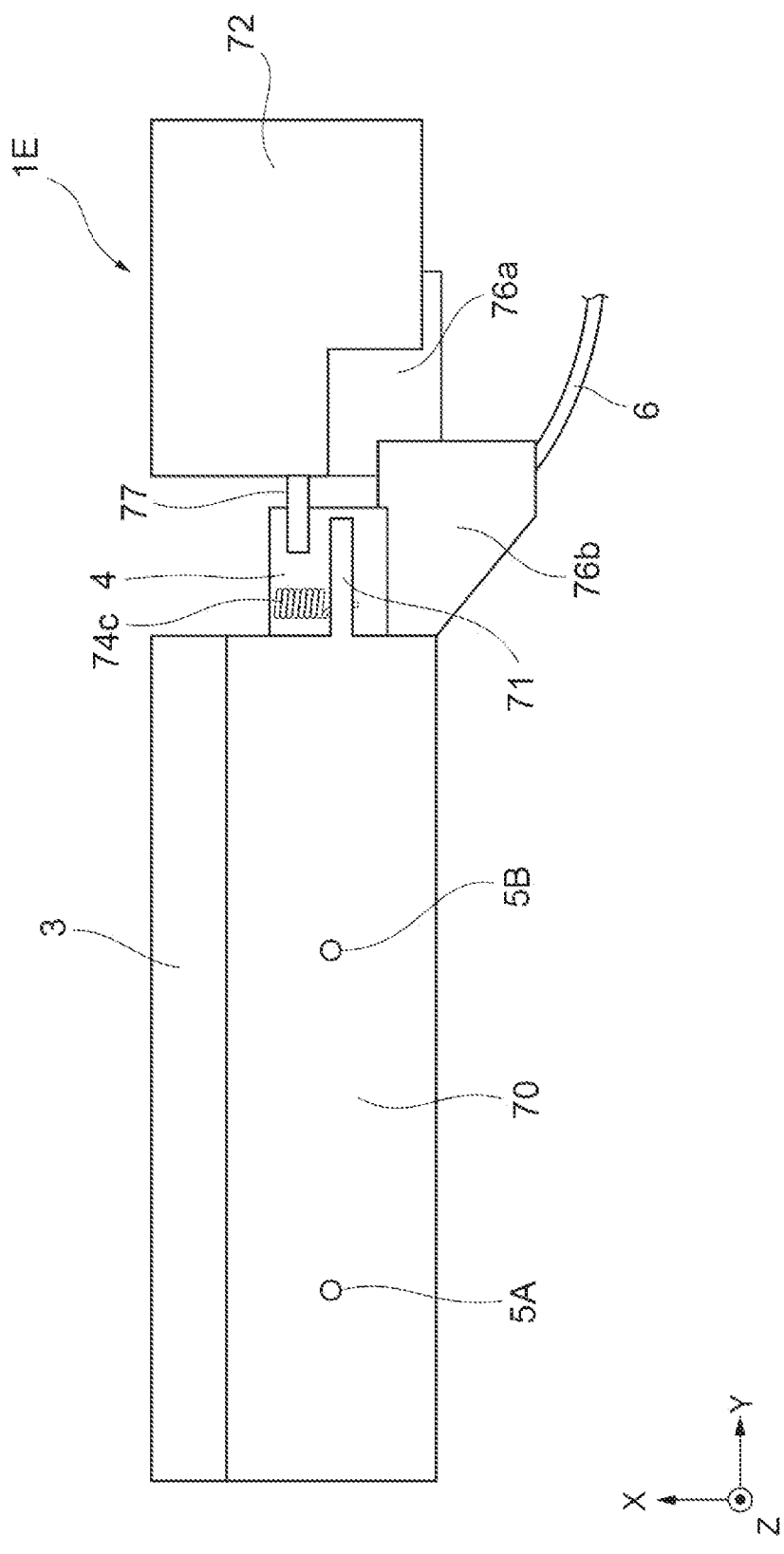
FIG. 11 is a schematic plan view of the antenna device according to the fourth modified example.

Hereinafter, a specific modified example will be described with reference to FIG. 11. Hereinafter, differences from the above-described antenna device 1 will be mainly described, and redundant description will be omitted. FIG. 11 is a plan view schematically showing an antenna device 1E according to the fourth modified example.

The antenna device 1E according to the modified example includes a first antenna element 70 and a second antenna element 72. The first antenna element 70 is an element to receives an AM signal, and the second antenna element 72 is an element to receives an FM signal. The first antenna element 70 has substantially the same structure as the antenna element 2 of the first embodiment. That is, the first antenna element 70 is a plate having an substantially rectangular planar shape, and is disposed apart from the shielding plate 3. The first antenna element 70 and the shielding plate 3 are connected to each other by insulating members 5A and 5B. The first antenna element 70 is disposed so as to overlap the shielding plate 3 when viewed from the Z direction, and the first antenna element 70 is shielded from noise from the noise source by the shielding plate 3. A connecting member 71 is connected to the first antenna element 70. The connecting member 71 is formed integrally with the first antenna element 70 and protrudes from the first antenna element 70 toward the Y direction. The connecting member 71 has a substantially L-shape. Further, in this modified example, the connecting member 71 is formed integrally with the first antenna element 70, but the first antenna element 70 and the connecting member 71 may be formed as separate members.

Figure 13:
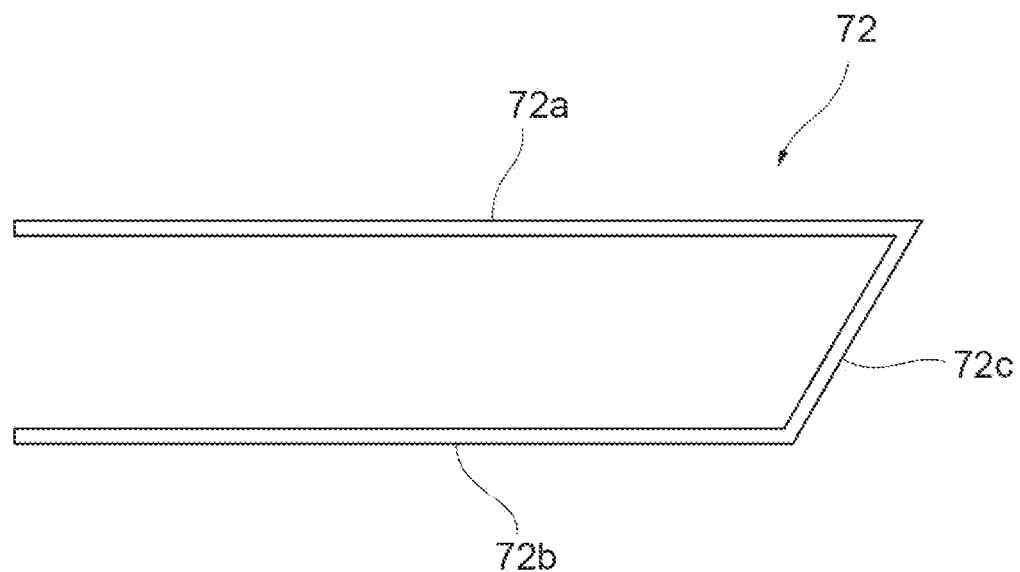
FIG. 13 is a side view of the second antenna element viewed from Y direction.
Figure 13:
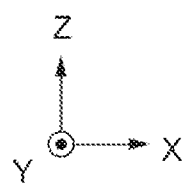

The second antenna element 72 is provided at a position shifted in the Y direction with respect to the first antenna element 70, and is disposed at a position not overlapping the shielding plate 3 when viewed from the Z direction. The second antenna element 72 is made of a metal or an alloy, and has an substantially L-shape in a plan view from the Z direction. FIG. 13 is a side view of the second antenna element 72 viewed from Y direction. As shown in FIG. 13, the second antenna element 72 includes a first plate portion 72a, a second plate portion 72b, and a third plate portion 72c.

Figure 12:
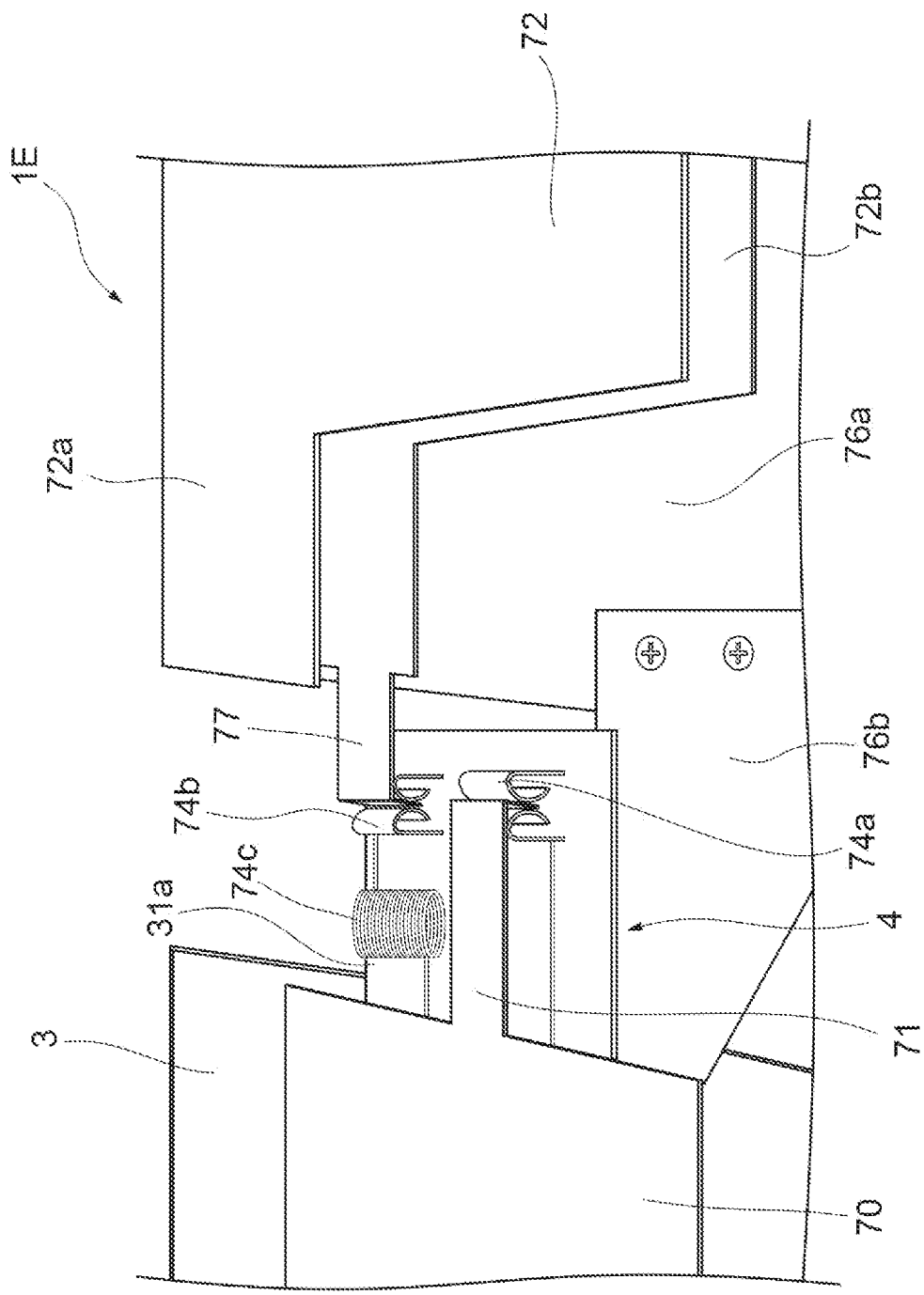
FIG. 12 is an enlarged perspective view showing a part of the antenna device according to the fourth modified example.

The first plate portion 72a of the second antenna element 72 is disposed on the same plane as the first antenna element 70. The second plate portion 72b is provided so as to face the first plate portion 72a in the Z direction. The first plate portion 72a and the second plate portion 72b are connected to each other via a third plate portion 72c. That is, the second antenna element 72 is formed in a substantially U-shape when viewed from the Y direction by bending a plate twice. As shown in FIG. 12, the second antenna element 72 is fixed to the shielding plate 3 via an insulating plate 76a and a coupling member 76b. However, the method of fixing the second antenna element 72 and the shielding plate 3 is not limited thereto, and the second antenna element 76 and the shielding plate 60 may be directly fixed to the vehicle without using the insulating plate 76a and the coupling member 70 b as long as the second antenna element 70 and the shielding plate 60 are insulated from each other.

A connecting member 77 is connected to the second plate portion 72b. The connecting member 77 is formed integrally with the second antenna element 72 and protrudes from the second plate portion 72b toward the Y direction. The connecting member 77 has a substantially L-shape. Further, in this modified example, the connecting member 77 is formed integrally with the second antenna element 72, but the second antenna element 72 and the connecting member 77 may be formed as separate members.

A circuit substrate 4 is provided between the first antenna element 70 and the shielding plate 3. As shown in FIG. 12, a terminal 74a, a terminal 74b, and a coil 74c are provided on the main surface 31a of the circuit substrate 4. The terminal 74a is electrically connected to an amplifier circuit (not shown) via a pattern of the circuit substrate 4, and the terminal 74b is electrically connected to an amplifier circuit (not shown) via the coil 74 and a pattern of the circuit substrate 4. The terminal 74a and the terminal 74b are fitted with the tip of the connecting member 71 and the tip of the connecting member 77, respectively. The terminal 74a functions as a feeding point for an AM signal electrically connecting the first antenna element 70 and the circuit substrate 4, and the terminal 74b functions as a connector for an FM signal electrically connecting the second antenna element 72 and the coil 74c. Therefore, the AM signal received by the first antenna element 70 is sent to the circuit substrate 4 via the connecting member 71 and the terminal 74a. The FM signal received by the second antenna element 72 is sent to the circuit substrate 4 via the connecting member 77, the terminal 74b, and the coil 74c. The coil 74c has a function of resonating the second antenna element 72 with the frequency of the FM signal.

As described above, in the antenna device 1E, only the first antenna element 70 of the first antenna element 70 and the second antenna element 72 is shielded by the shielding plate 3. Since the antenna element for the AM signal is less likely to be affected by surrounding conductors, the first antenna element 70 is shielded by the shielding plate 3, so that the noise toward the first antenna element 70 can be suppressed by the shielding plate 3 while ensuring the reception sensitivity of the AM signal. On the other hand, if there is a conductor around the antenna element for FM signals, the reception sensitivity of the FM signals may decrease. In the antenna device 1E, since the second antenna element 72 is disposed at a position not overlapping the shielding plate 3 when viewed from the Z direction, it is possible to suppress a decrease in the reception sensitivity of the FM signal.

Further, in the antenna device 1E, since only the first antenna element 70 for AM signals is shielded by the shielding plate 3, the distance between the first antenna element 70 and the shielding plate 3 can be reduced, and as a result, the antenna device 1E can be downsized. Further, since the second antenna element 72 has a shape folded in an substantially U-shape, it is possible to reduce the size of the antenna device 1E while securing the reception sensitivity of the FM signal.

As another configuration in which the shielding plate suppresses noise from entering one of the antenna elements, an antenna device according to the following modified example is exemplified. The antenna device includes an antenna element (AM antenna element) for receiving AM radio and an antenna element (DTV antenna element) for receiving a signal for terrestrial digital broadcasting. The AM antenna element is a monopole antenna, and the DTV antenna element is a dipole antenna. The AM antenna element constitutes a part of the DTV antenna element. The ground of the circuit connected to the DTV antenna element may not be grounded to the vehicle. That is, the ground of the circuit connected to the DTV antenna element and the ground of the circuit connected to the AM antenna element may be electrically isolated from each other. The shielding plate included in the antenna device of this modified example is provided so as to suppress noise from entering the AM antenna element, for example, but not to suppress noise from entering the DTV antenna element. This is because the frequency for AM radio is lower than the frequency of radio waves of DTV.

In the above modified example, the monopole antenna and the dipole antenna are exemplified, but are not limited thereto. For example, all of the plurality of antenna elements may be monopole antennas or dipole antennas. In the above modified example, the antenna element for AM and the antenna element for DTV are exemplified, but the present invention is not limited thereto. For example, the plurality of antenna elements may include an AM antenna element and an antenna element for receiving FM radio (FM antenna element). In this case, for example, the shielding plate may be provided so as not to suppress the entry of noise into the FM antenna element while being provided so as to suppress the entry of noise into the AM antenna element.

The first antenna element 70 may be connected to the circuit substrate 4 using any connection means such as screws or solder instead of the terminal 74a. Similarly, the second antenna element 72 may be connected to the circuit substrate 4 using any connection means such as a screw or solder instead of the terminal 74b. The first antenna element 70 and the second antenna element 72 may be connected to different terminals or may be connected to the same terminal.

The second antenna element 72 of the antenna device 1E has a shape bent in a U-shape, but may not be bent if there is enough room for installation.

Further, the shapes of the first antenna element 70 and the second antenna element 72 of the antenna device 1E are not limited to those in the above-described embodiment. For example, the first antenna element 70 and the second antenna element 72 may have circular shape or polygonal shape in a plan view. The first antenna element 70 and the second antenna element 72 are not limited to the plate-like structure, and may have a meander structure, a net-like structure, or the like. From the viewpoint of structurally facilitating the grounding to a metal member of the vehicle, the first antenna element 70 and the second antenna element 72 may be provided on the substrate, for example, or may be film-shaped. When the first antenna element 70 and the second antenna element 72 have a film shape, the first antenna element 70 and the second antenna element 72 may be covered with a protective film.

REFERENCE SIGNS LIST 1, 1A-1E: antenna device, 2, 2A: antenna element, 2a: edge, 3: shielding plate, 3a: main surface (second main surface), 3b: edge, 4, 4A: circuit substrate, 5A, 5B: insulating member, 6: cable, 7: ground wire, 8: cable, 9: cover, 11: element portion, 11a: main surface, 11b: main surface (first main surface), 12: power supply portion, 21: first plate portion, 22: second plate portion, 23: third plate portion, 24: bracket portion, 31: substrate portion. 31a, 31b: main surface, 32: amplifier circuit, 41: fixing member, 70: first antenna element, 72: second antenna element, 100: vehicle, 101: vehicle body, 110: bracket. 120: rear spoiler.

The invention claimed is:

1. An antenna device for a vehicle, the antenna device comprising:
 a rectangular antenna element having a first main surface and an orthogonal power supply for receiving radio waves used for AM radio, FM radio, DAB (Digital Audio Broadcast), terrestrial digital broadcasting, BAND 3, or telephone;
 a shielding plate having a second main surface wider than the first main surface, the shielding plate having multiple bends and overlapping the antenna element when viewed from a direction perpendicular to the first main surface to block a noise source in the vehicle; and
 insulating members located between the first main surface and the second main surface, the insulating members connecting the antenna element and the shielding plate such that the antenna element and the shielding plate are electrically insulated from each other,
 wherein the antenna device is installed in a rear spoiler of the vehicle.

2. The antenna device according to claim 1, further comprising
 a circuit substrate provided on the second main surface of the shielding plate and electrically connected to the antenna element, and
 wherein the circuit substrate is smaller than the first main surface in a plan view.

3. The antenna device according to claim 2, wherein the circuit substrate includes a substrate portion attached to the second main surface and an amplifier circuit provided on the substrate portion, and
 the amplifier circuit is located between the antenna element and the substrate portion.

4. The antenna device according to claim 1, further comprising
 a circuit substrate provided apart from the shielding plate and electrically connected to the antenna element, and
 wherein the circuit substrate is accommodated in a cover and attached to the antenna element, or accommodated in the vehicle.

5. The antenna device according to claim 2, further comprising
 an inductor electrically connected to the circuit substrate and the antenna element.

6. The antenna device according to claim 1, wherein the shielding plate is directly attached to a metal member of the vehicle.

7. The antenna device according to claim 1, further comprising
 a ground wire electrically connected to the shielding plate, and
 wherein a length of the ground wire is 10 cm or less.

8. The antenna device according to claim 1, further comprising
 a ground wire electrically connected to the shielding plate, and
 wherein a length of the ground wire is 70 cm or more and 100 cm or less.

9. The antenna device according to claim 1, wherein at least one of the antenna element and the shielding plate has flexibility.

10. The antenna device according to claim 1, wherein the antenna element includes a first antenna element to receive an AM signal and a second antenna element to receive an FM signal, and
 the first antenna element and the shielding plate are disposed so as to overlap each other, and the second antenna element and the shielding plate are disposed so as not to overlap each other, in a plan view.

11. The antenna device according to claim 1, further comprising
 a circuit substrate provided on the second main surface of the shielding plate and electrically connected to the antenna element.

12. The antenna device according to claim 1, further comprising
 a circuit substrate provided between the first main surface and the second main surface and electrically connected to the antenna element.

13. The antenna device according to claim 1, wherein the antenna element has a plate shape.

* * * * *